Figure 1:
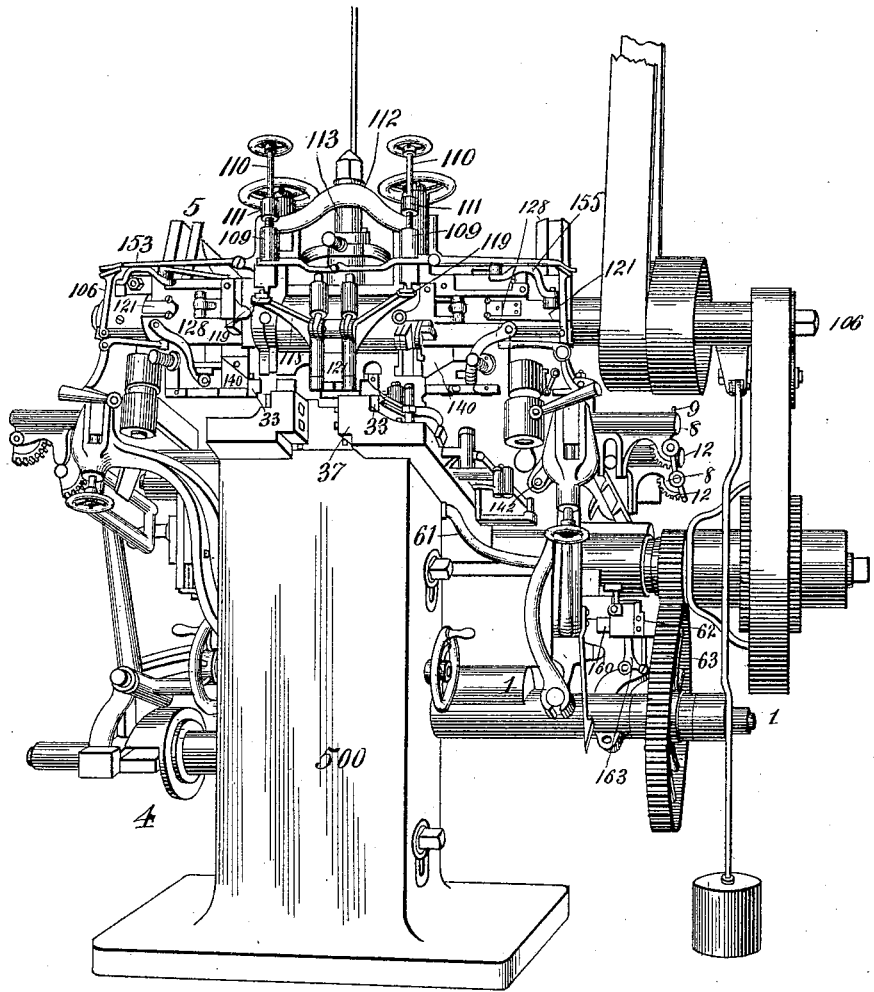

(No Model.) 29 Sheets—Sheet 1.

J. F. FRENCH.
FILE CUTTING MACHINE.

No. 390,075. Patented Sept. 25, 1888.

Witnesses:

Inventor.
Josiah F. French
by his attorney
George Harding (No Model.)

J. F. FRENCH.

FILE CUTTING MACHINE.

No. 390,075. Patented Sept. 25, 1888.

29 Sheets—Sheet 3.

WITNESSES:

INVENTOR (No Model.)
J. F. FRENCH.
FILE CUTTING MACHINE.
No. 390,075. Patented Sept. 25, 1888.
29 Sheets—Sheet 4.
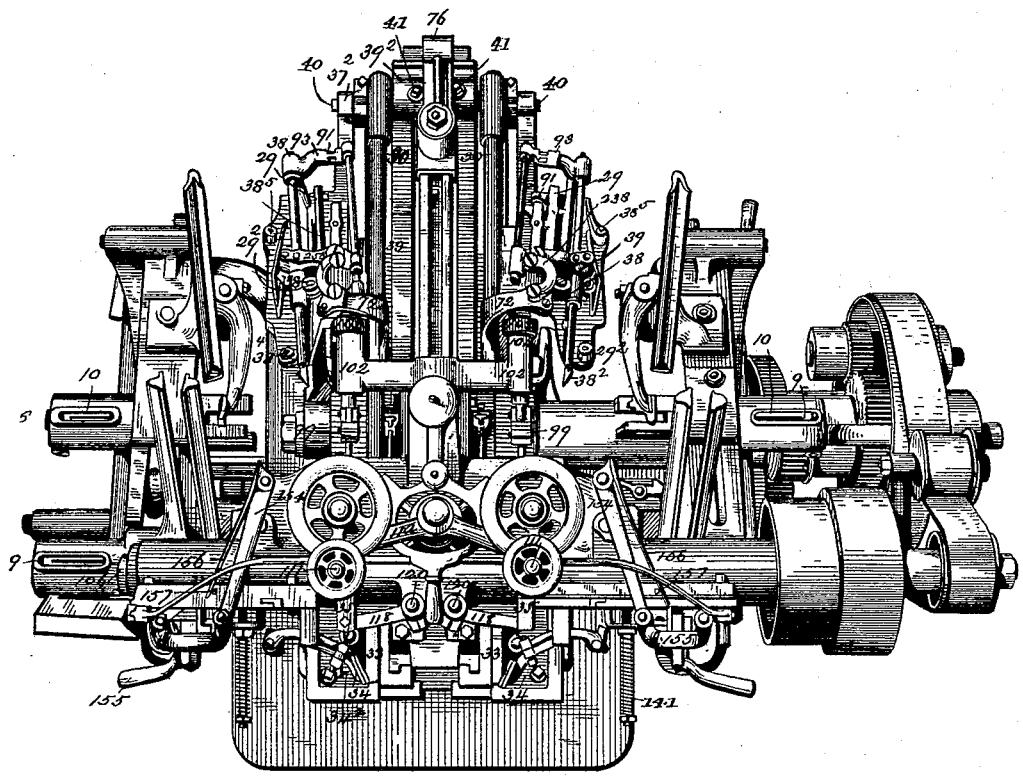
Fig. 4.
WITNESSES:
INVENTOR

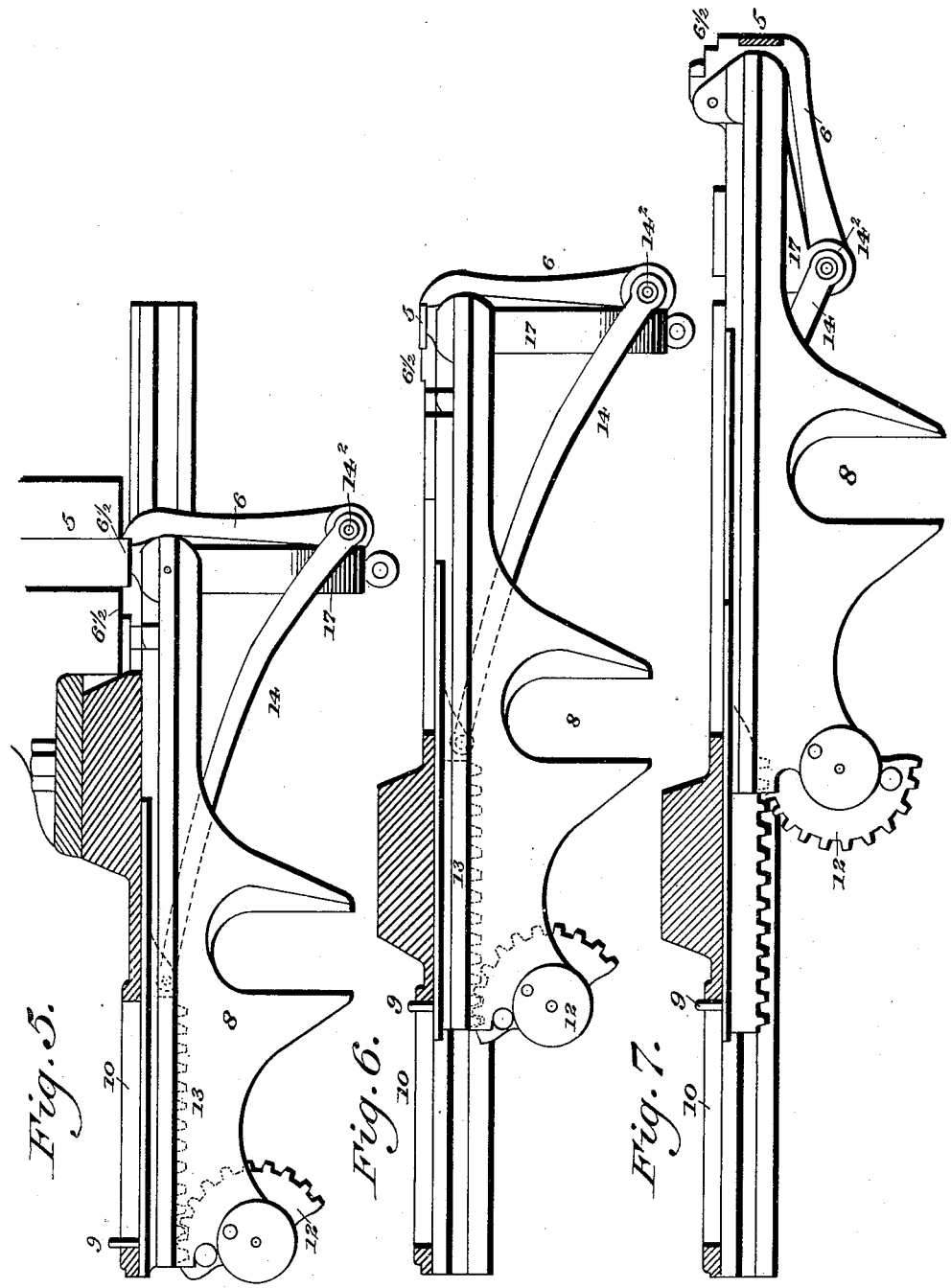

(No Model.)  29 Sheets—Sheet 6.
J. F. FRENCH.
FILE CUTTING MACHINE.
No. 390,075.  Patented Sept. 25, 1888.
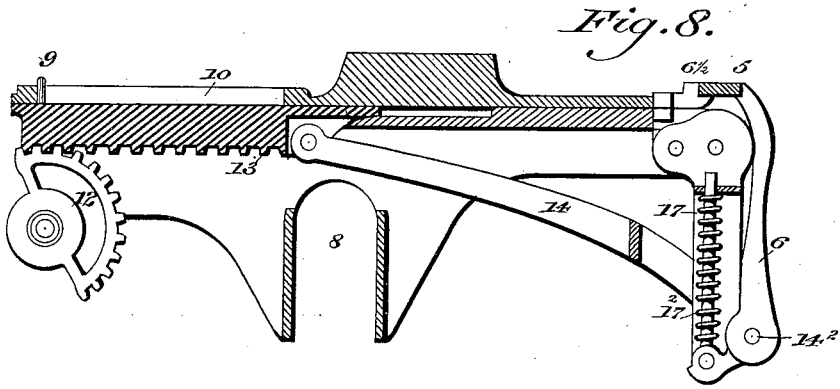
Fig. 8.
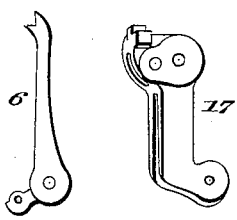
Fig. 9.  Fig. 10.
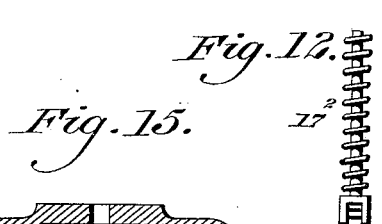
Fig. 12.  Fig. 15.
Fig. 13.
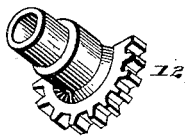
Fig. 14.
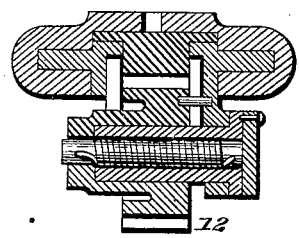
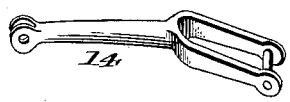
Fig. 17.
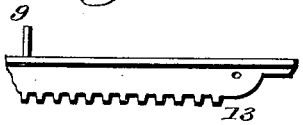
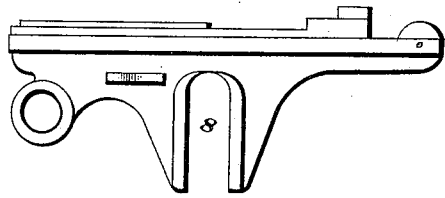
Fig. 18.
WITNESSES:  INVENTOR (No Model.)
J. F. FRENCH.
FILE CUTTING MACHINE.
No. 390,075. Patented Sept. 25, 1888.
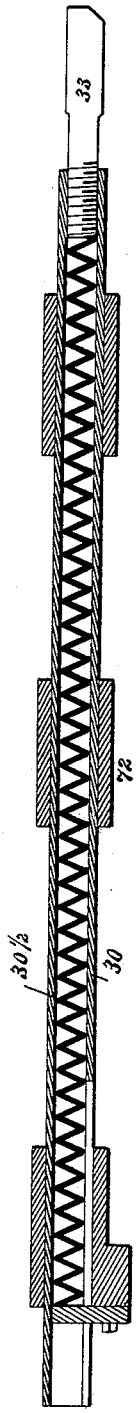
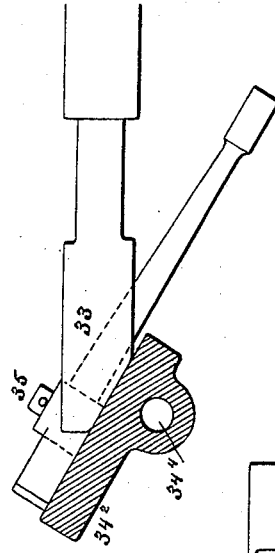
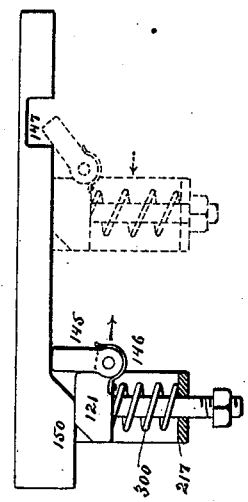
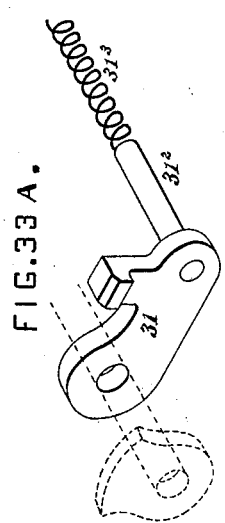
Attest:
H. Quick
D. S. Groff
Inventor:
Josiah F. French
by his attorney
George Harding (No Model.) 29 Sheets—Sheet 8.
J. F. FRENCH.
FILE CUTTING MACHINE.
No. 390,075. Patented Sept. 25, 1888.
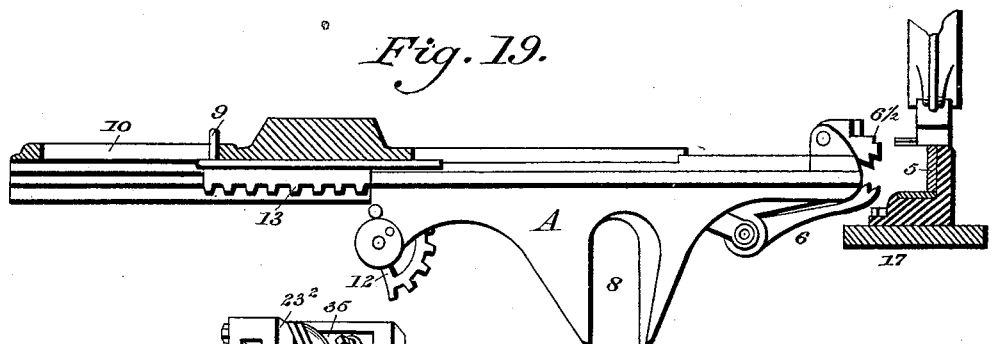
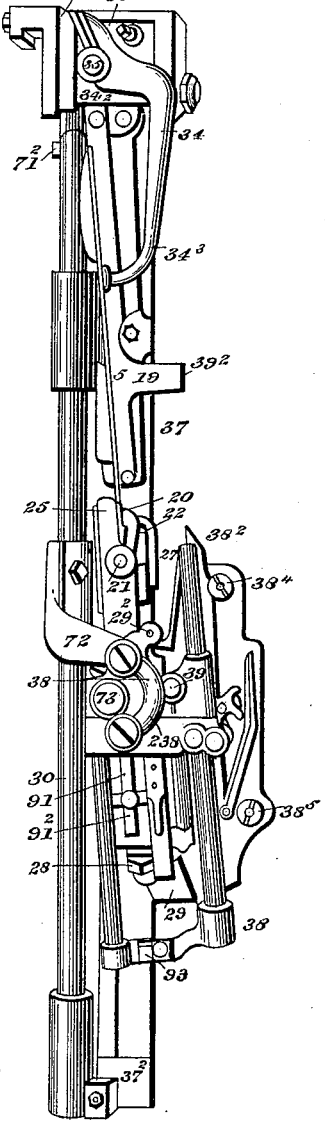
WITNESSES:
INVENTOR

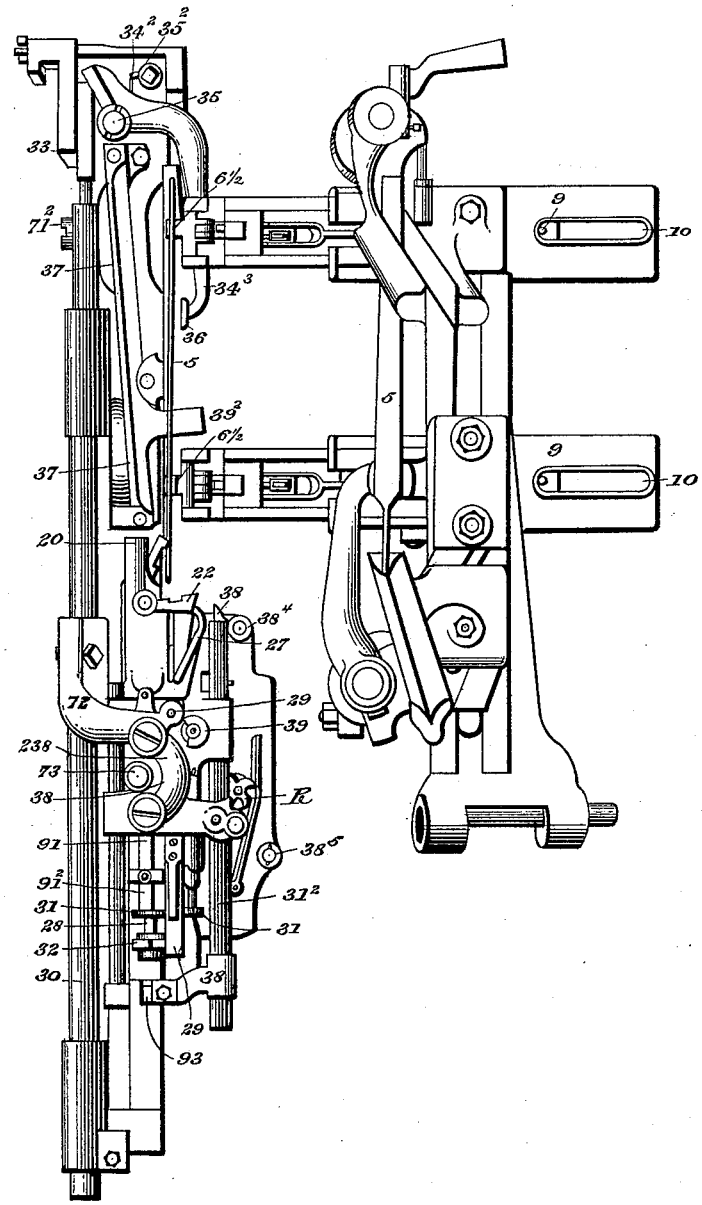

(No Model.) 29 Sheets—Sheet 10.
J. F. FRENCH.
FILE CUTTING MACHINE.
No. 390,075. Patented Sept. 25, 1888.
Fig. 22.
Fig. 24.
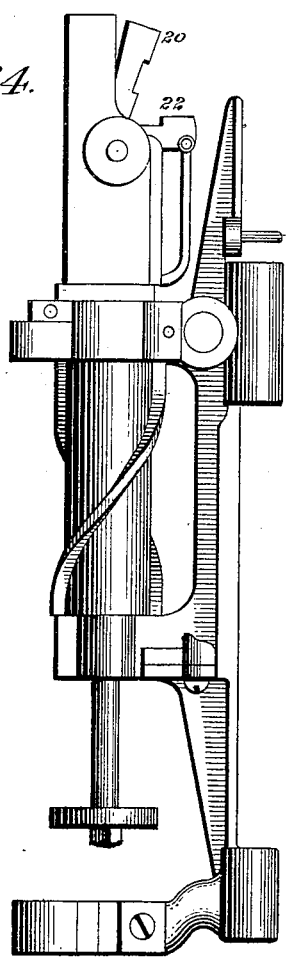
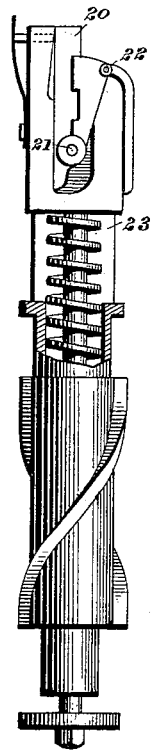
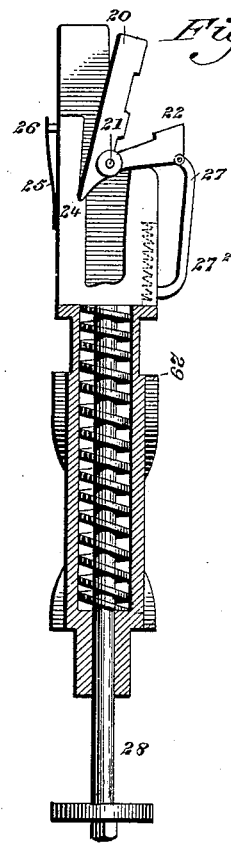
Fig. 21.
Fig. 23.
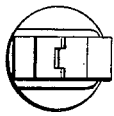
Witnesses
Inventor
Josiah F. French

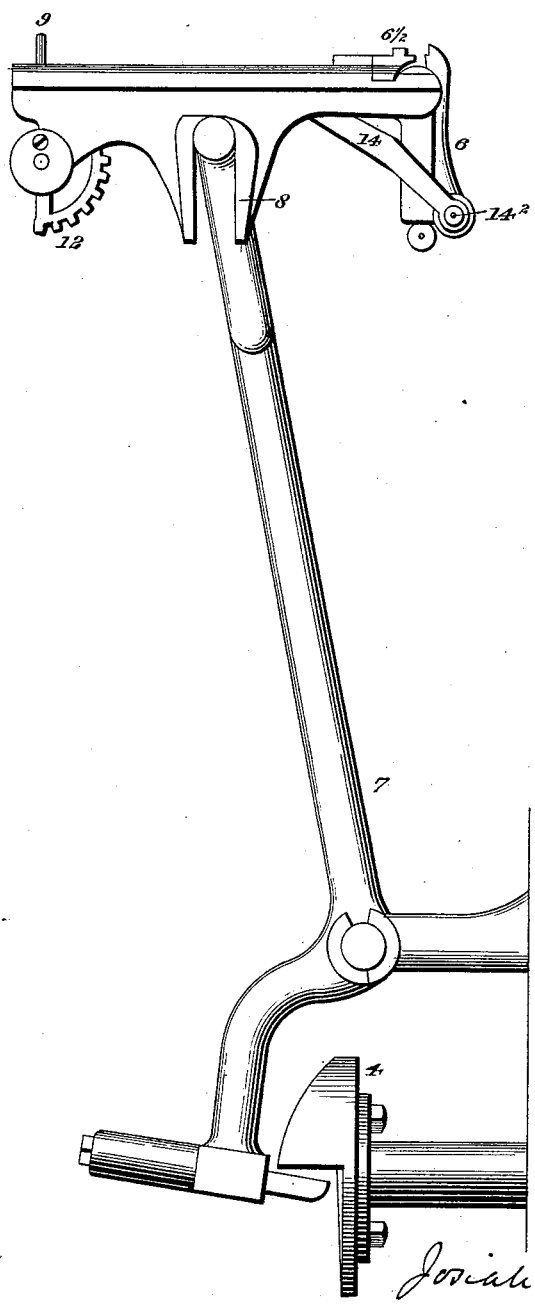

(No Model.) 29 Sheets—Sheet 12.
J. F. FRENCH.
FILE CUTTING MACHINE.
No. 390,075. Patented Sept. 25, 1888.
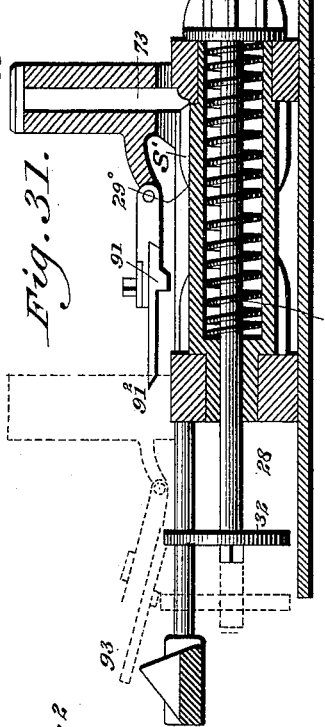
WITNESSES:
INVENTOR
Josiah F. French
by his att'y
George Harding (No Model.) 29 Sheets—Sheet 13.

J. F. FRENCH.
FILE CUTTING MACHINE.

No. 390,075. Patented Sept. 25, 1888.

Attest:
H. Quick
W. S. Groff

Inventor:
Josiah F. French
by his attorney
George Harding

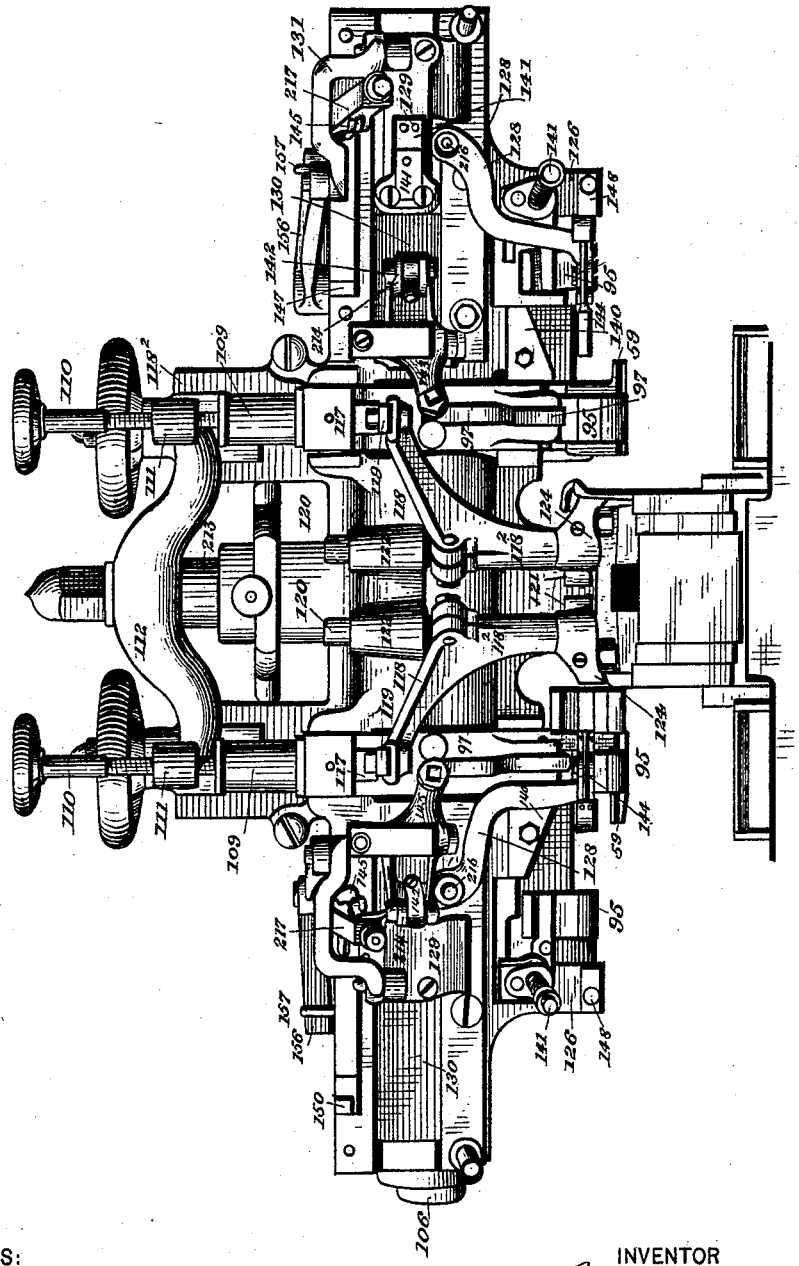

(No Model.) 29 Sheets—Sheet 15.

J. F. FRENCH.
FILE CUTTING MACHINE.

No. 390,075. Patented Sept. 25, 1888.

WITNESSES:
P. F. Nagle
[signature]

INVENTOR
Josiah F. French
by his atty.
George Harding (No Model.) 29 Sheets—Sheet 16.
J. F. FRENCH.
FILE CUTTING MACHINE.
No. 390,075. Patented Sept. 25, 1888.
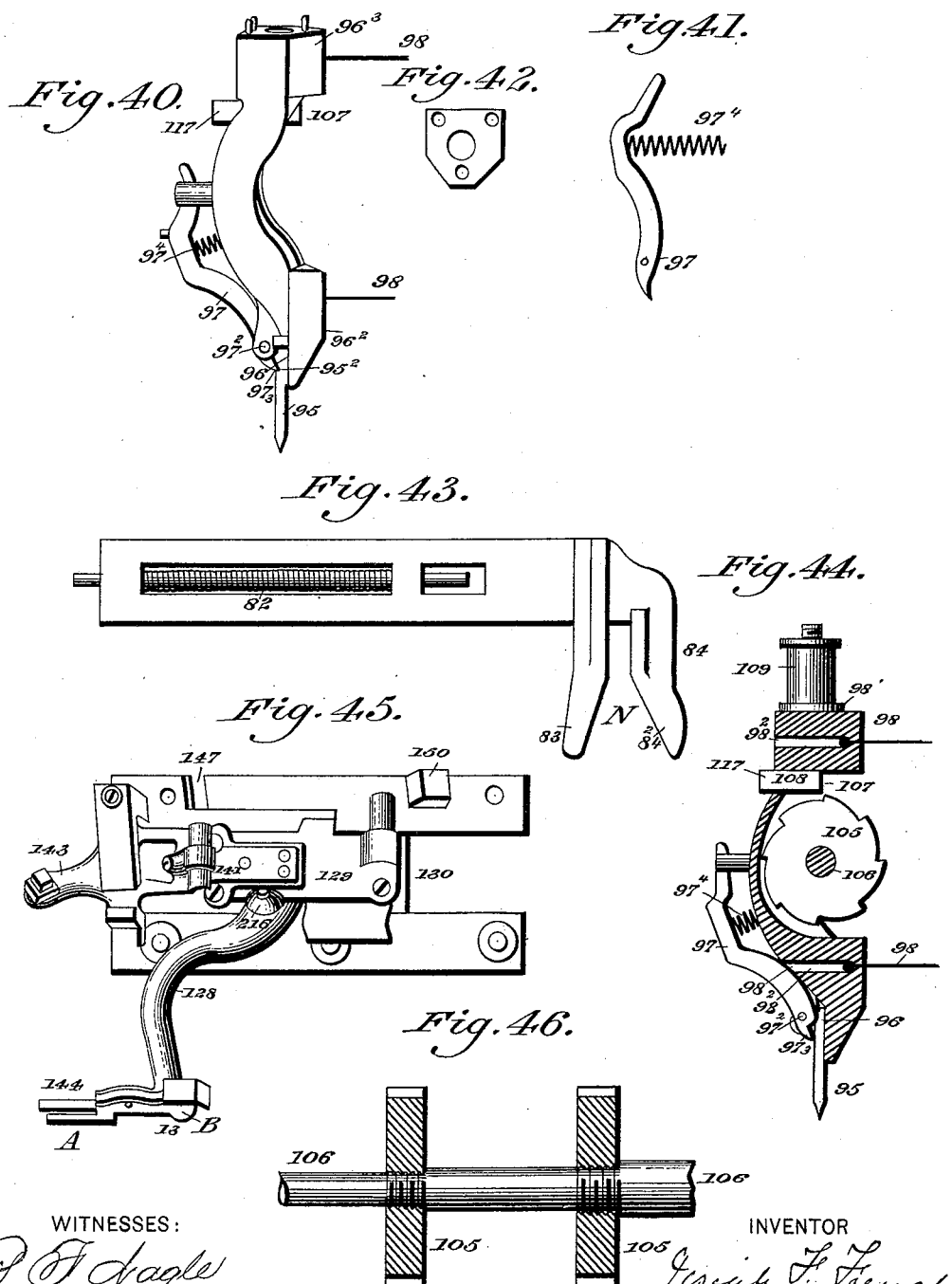
WITNESSES:
INVENTOR

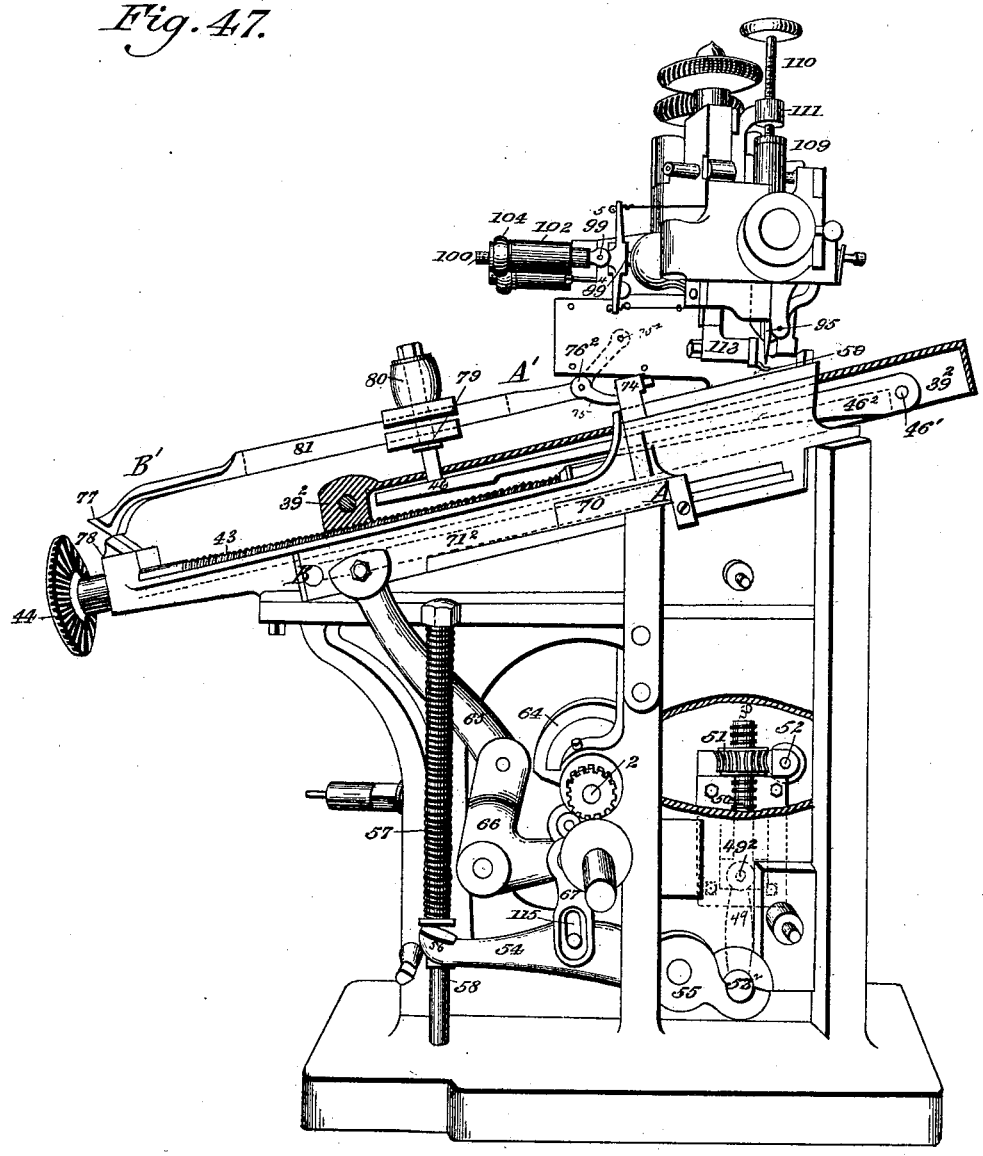

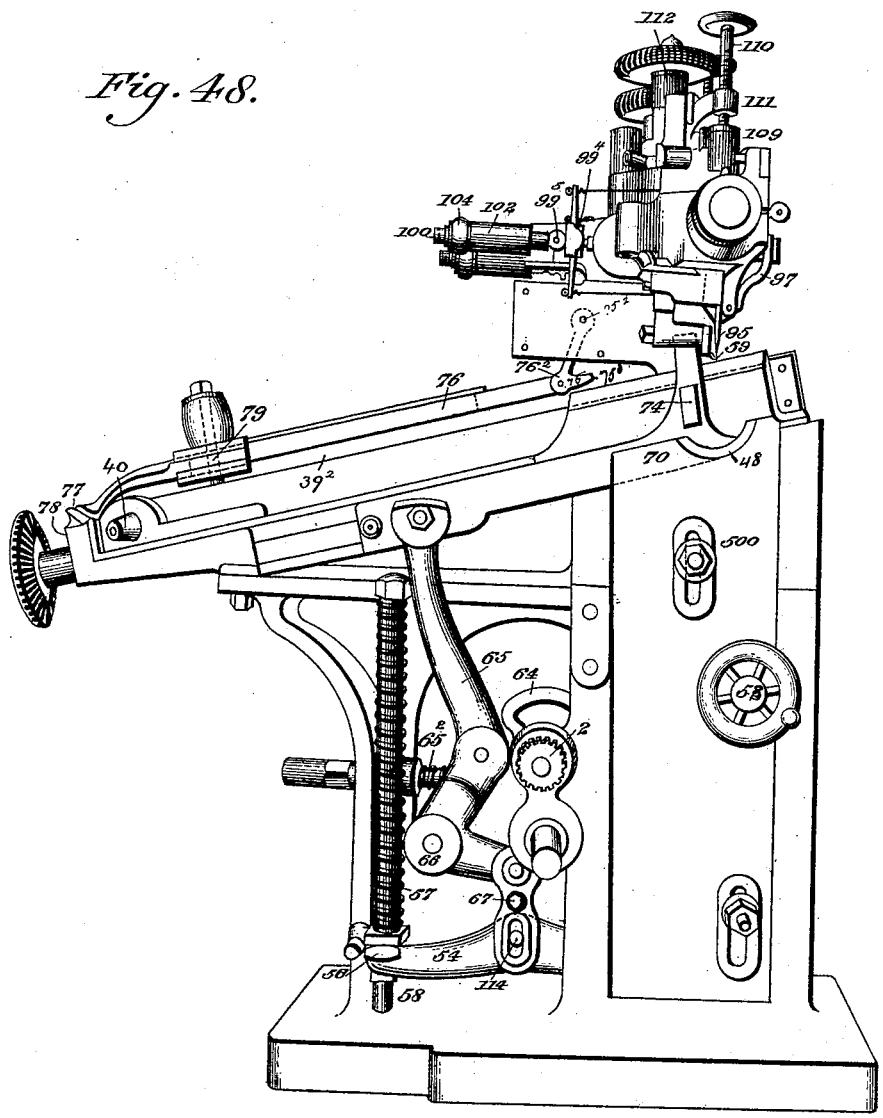

(No Model.) 29 Sheets—Sheet 19.
J. F. FRENCH.
FILE CUTTING MACHINE.
No. 390,075. Patented Sept. 25, 1888.
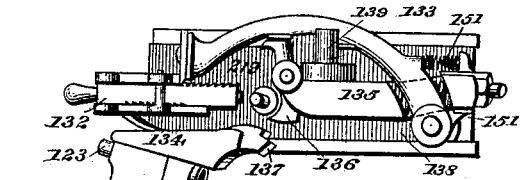
Fig. 49.
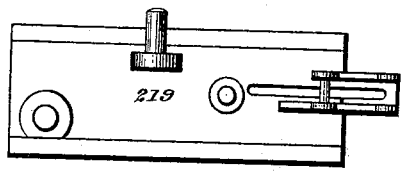
Fig. 50.
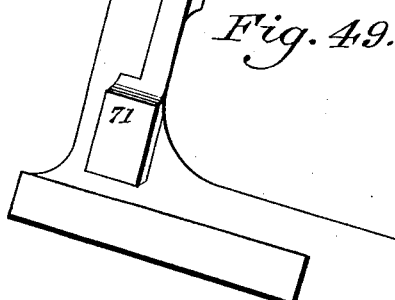
Fig. 51.
Fig. 52.
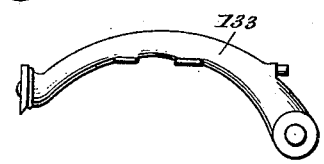
Fig. 53.
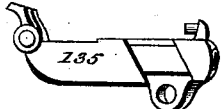
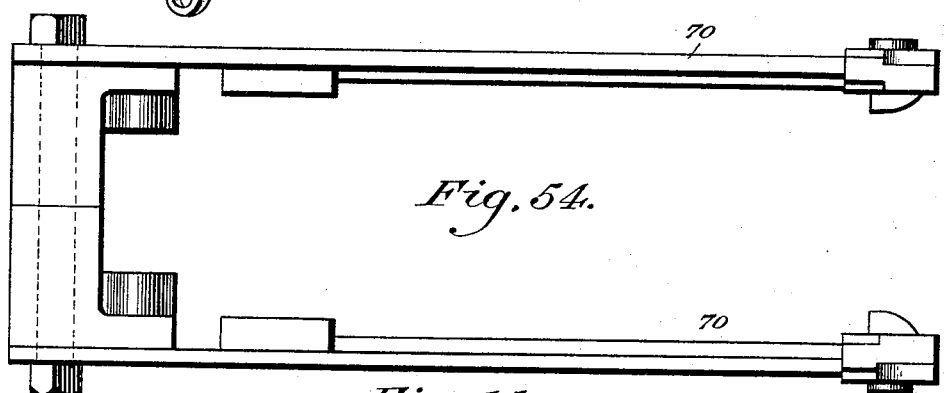
Fig. 54.
Fig. 55.
WITNESSES:
INVENTOR
Josiah F. French (No Model.) 29 Sheets—Sheet 20.
J. F. FRENCH.
FILE CUTTING MACHINE.
No. 390,075. Patented Sept. 25, 1888.
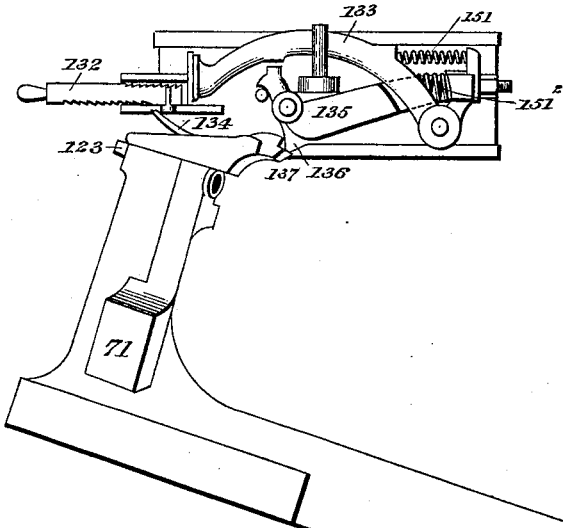
Fig. 56.
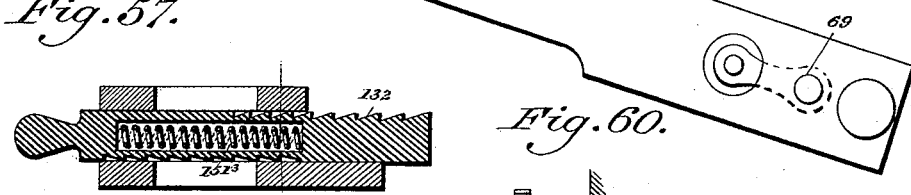
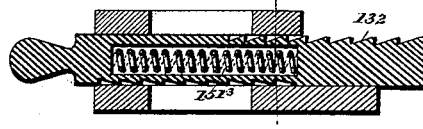
Fig. 57.
Fig. 60.
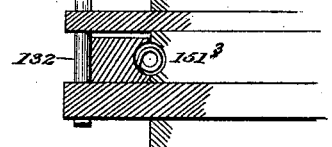
Fig. 59.
Fig. 58.
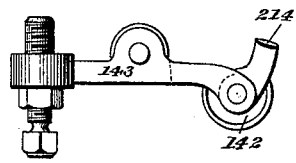
WITNESSES:
INVENTOR
Josiah F. French
N. PETERS, Photo-Lithographer, Washington, D. C.

(No Model.)

29 Sheets—Sheet 21.

J. F. FRENCH.
FILE CUTTING MACHINE.

No. 390,075. Patented Sept. 25, 1888.

WITNESSES:

INVENTOR
Josiah F. French (No Model.)

29 Sheets—Sheet 24.

J. F. FRENCH.
FILE CUTTING MACHINE.

No. 390,075. Patented Sept. 25, 1888.

WITNESSES:

INVENTOR
Josiah F. French
by his atty
G. T. Harding (No Model.)
29 Sheets—Sheet 25.
J. F. FRENCH.
FILE CUTTING MACHINE.
No. 390,075. Patented Sept. 25, 1888.
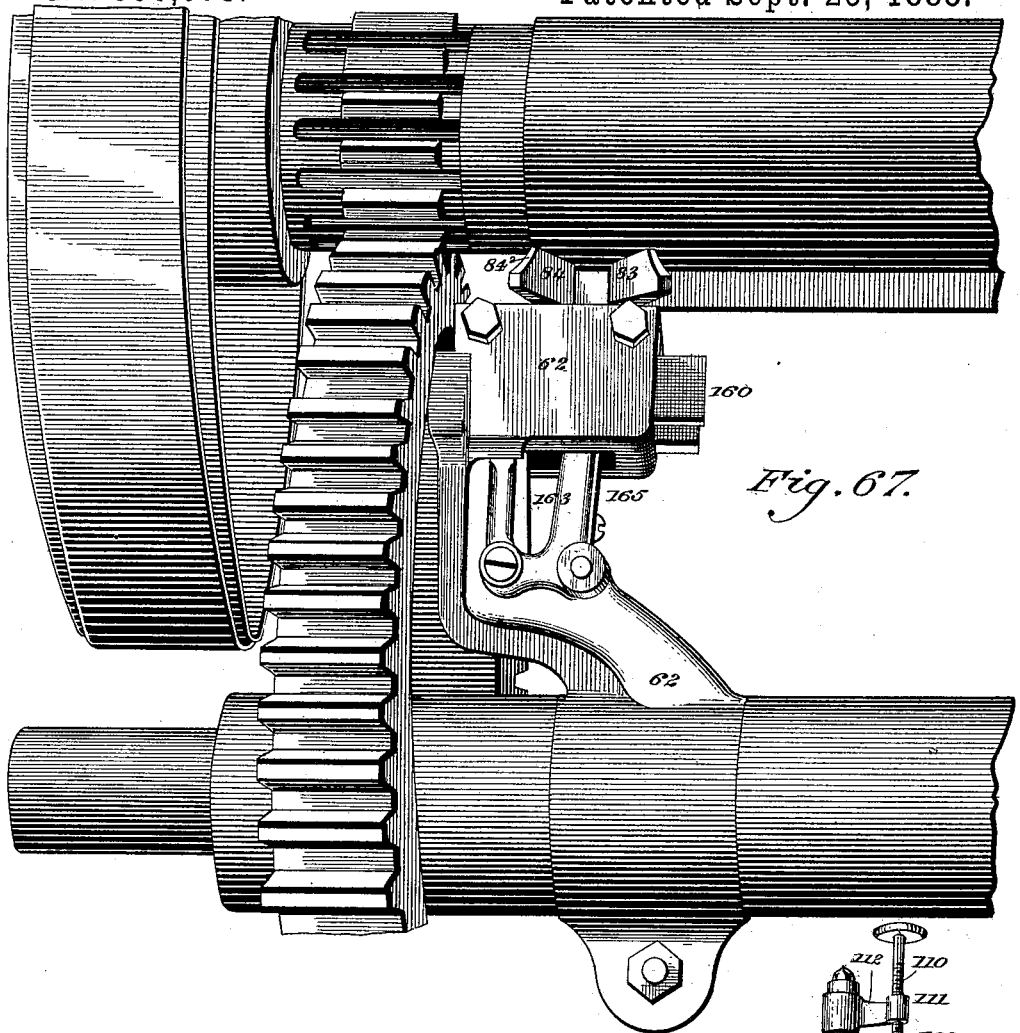
Fig. 67.
Fig. 68.
WITNESSES:
INVENTOR
Josiah F. French

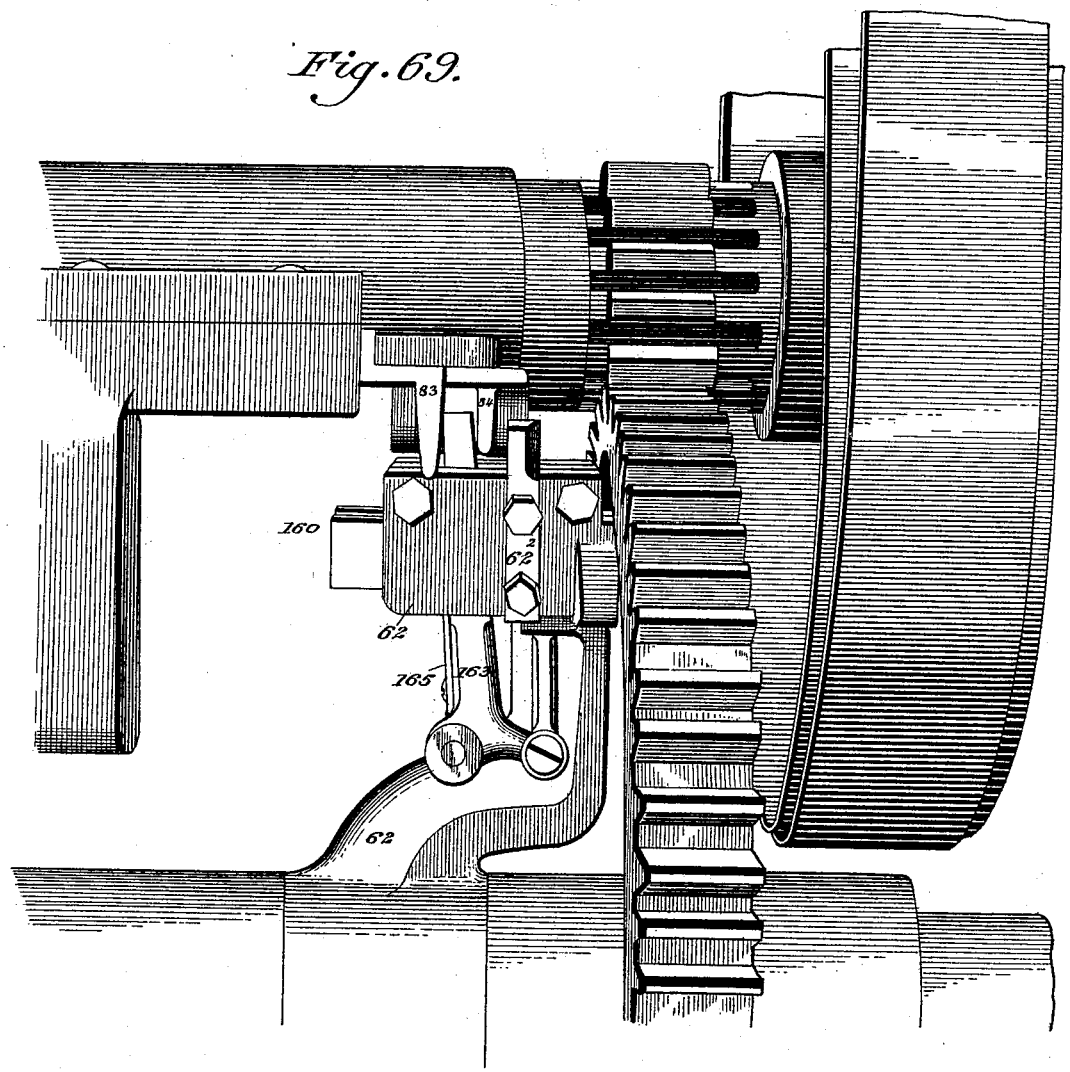

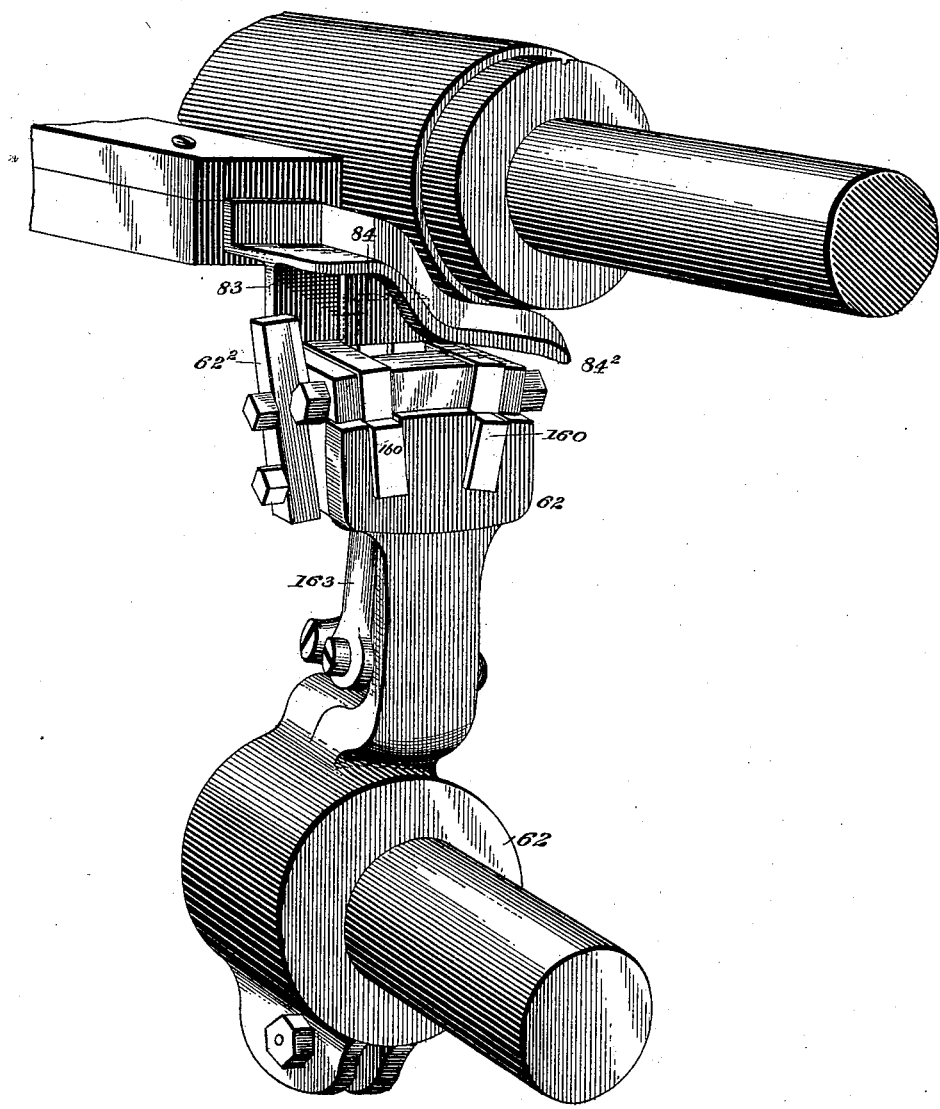

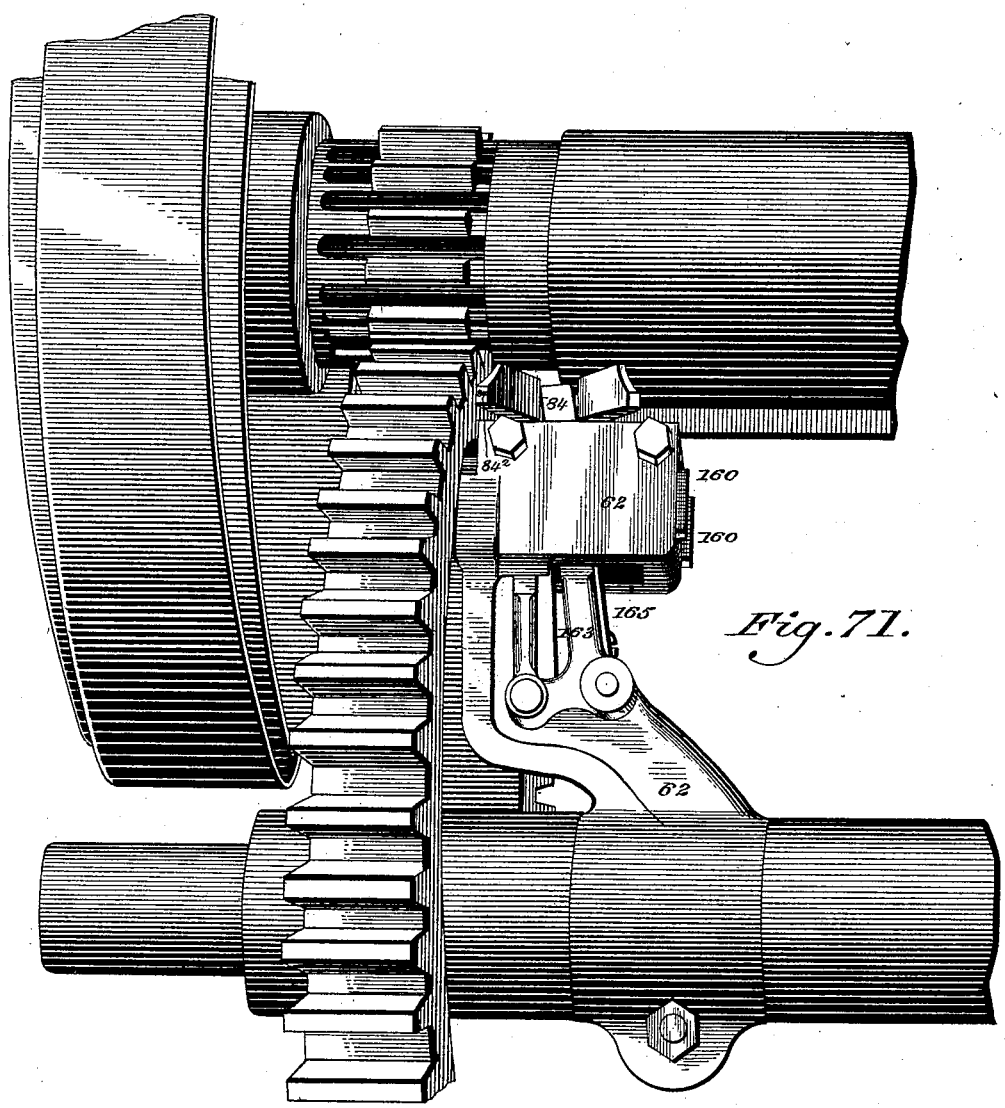

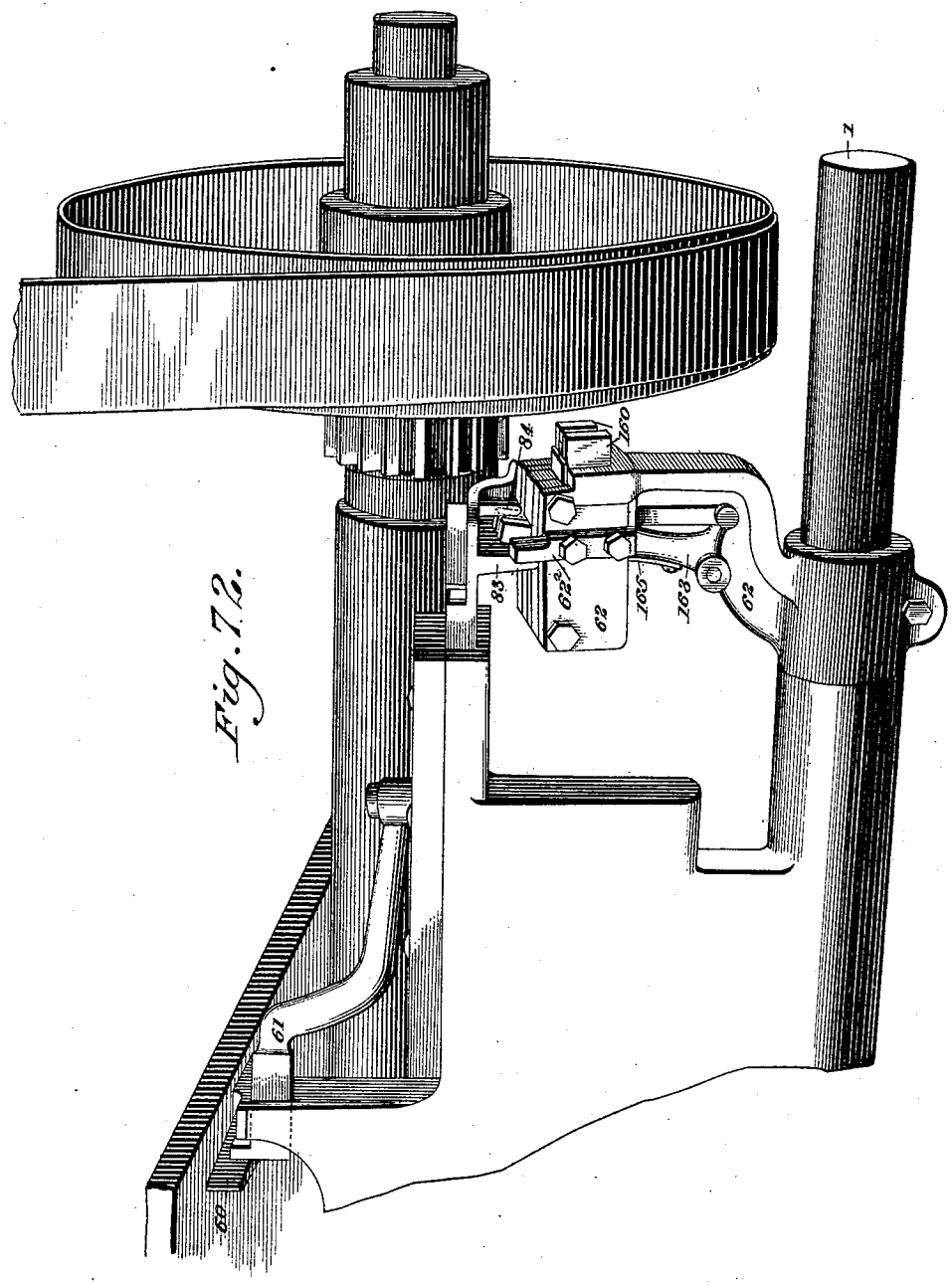

UNITED STATES PATENT OFFICE.

JOSIAH F. FRENCH, OF PHILADELPHIA, PENNSYLVANIA.

FILE-CUTTING MACHINE.

SPECIFICATION forming part of Letters Patent No. 390,075, dated September 25, 1888.

Application filed March 21, 1887. Serial No. 231,791. (No model.)

*To all whom it may concern:*

Be it known that I, JOSIAH F. FRENCH, of Philadelphia, State of Pennsylvania, have invented a new and useful Improvement in Automatic File-Cutting Machines, of which the following is a true and exact description, due reference being had to the accompanying drawings, which form a part hereof.

My invention has for its object to provide a machine for automatically cutting the filing-surfaces upon the sides and edges of files in succession; and it consists in suitable mechanism, set out hereinafter, for producing the following effects: The file-blanks, which are in a condition to have their filing-surfaces cut upon their edges or sides, are conveyed from a file-blank magazine to a file-blank chuck, which chuck, while holding the file-blank, is carried under a chisel, which is caused to reciprocate, and thus cut the filing-surface upon one edge or side, and after the chuck, with its file-blank, has passed upward, so that the entire length of the side or edge of the file-blank is presented to the cutting-chisel, the file-blank and chuck are turned so as to present its uncut side or edge of the blank, and the carriage carrying the chuck is caused to return to its original position. The file-blank while in the custody of the chuck is then again passed up under the chisel, so that the opposite face or edge has its filing-surface cut by the same motion as before, and then the file-blank is dropped from the chuck and the carriage returned to its original position a second time and the chuck left in a condition to receive another blank.

It also consists in a novel mechanism for automatically feeding the chisels into the chisel-holder and removing the chisel when its cutting-surface becomes worn.

It is to be understood that the mechanisms for accomplishing these functions may be made in various ways, the slight deviations from the mechanism hereinafter set out being of no moment, the same being fully within the scope of the invention, which is more or less generic in its character.

By reference to the drawings which accompany this specification a more detailed description of the operation can be obtained, as well as a specific description of the mechanisms employed, in which drawings similar numbers denote similar parts.

Figure 2:
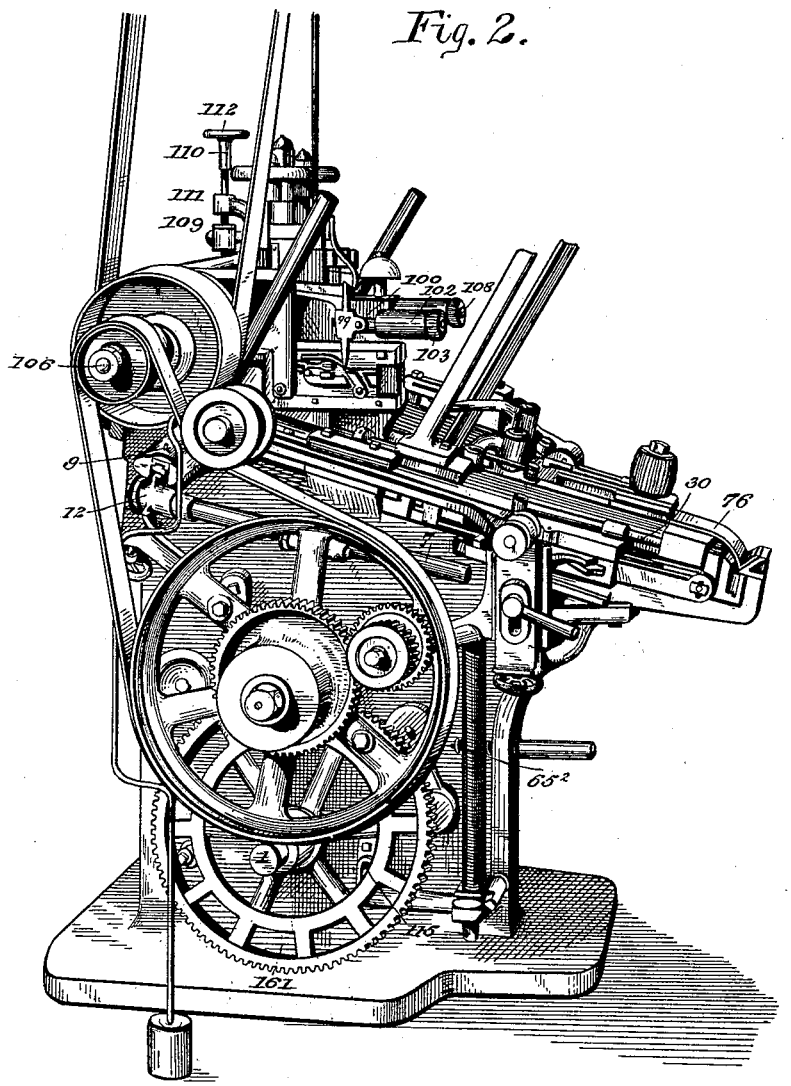
Figure 3:
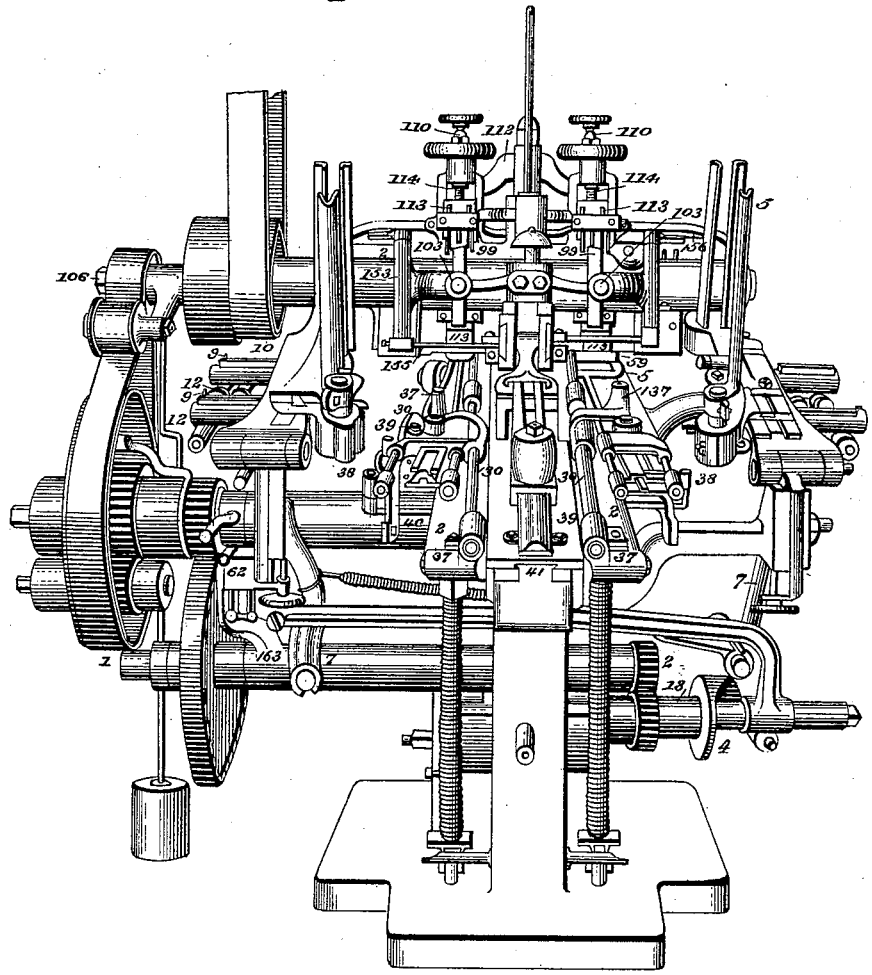
Figure 29:
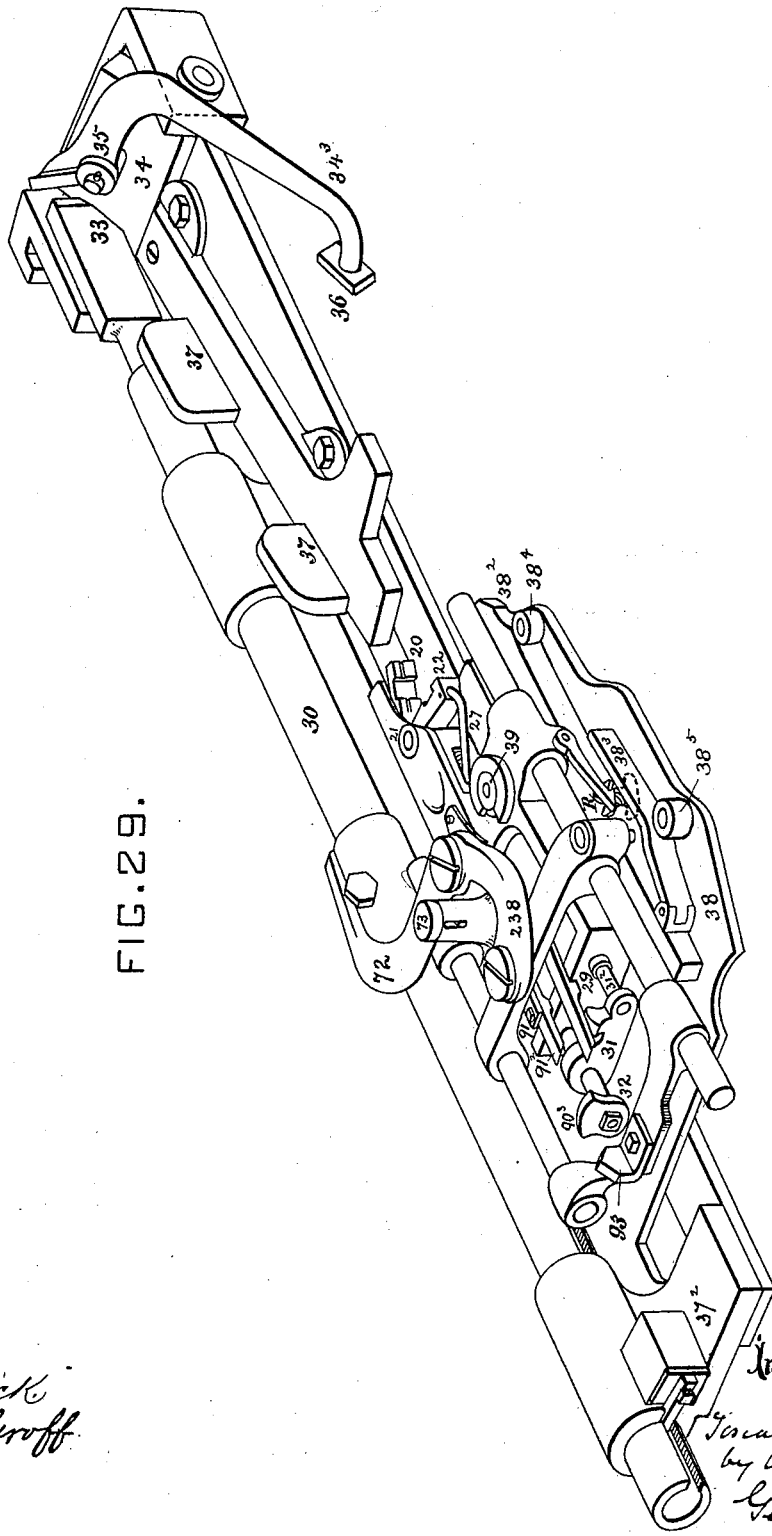
Figure 36:
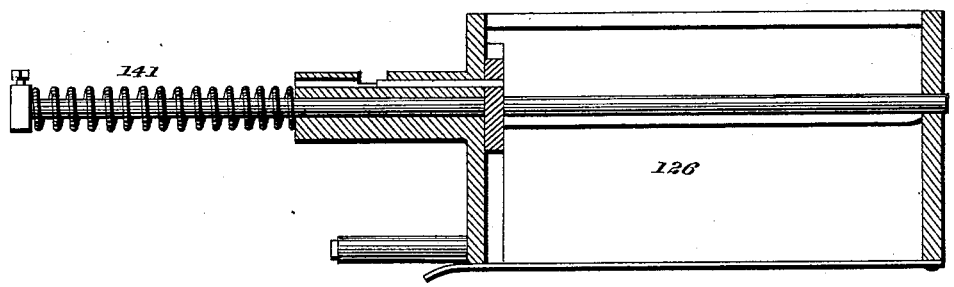
Figure 37:
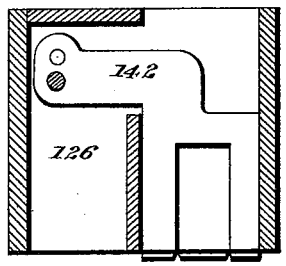
Figure 38:
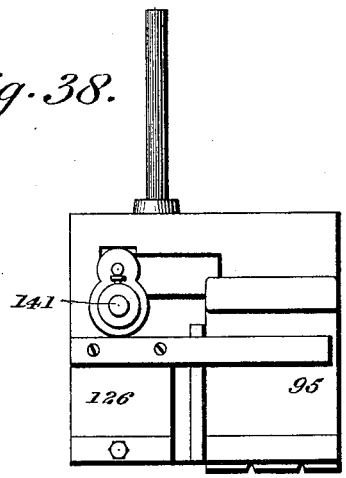
Figure 39:
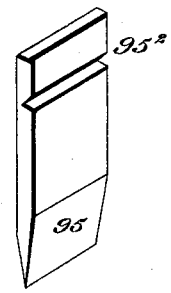
Figure 61:
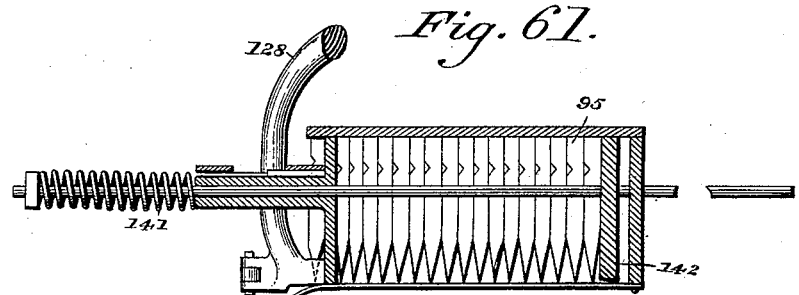
Figure 62:
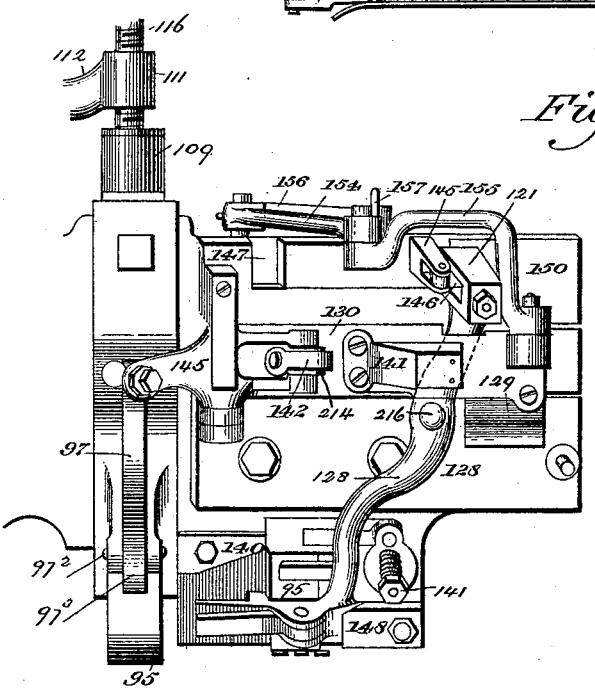
Figure 63:
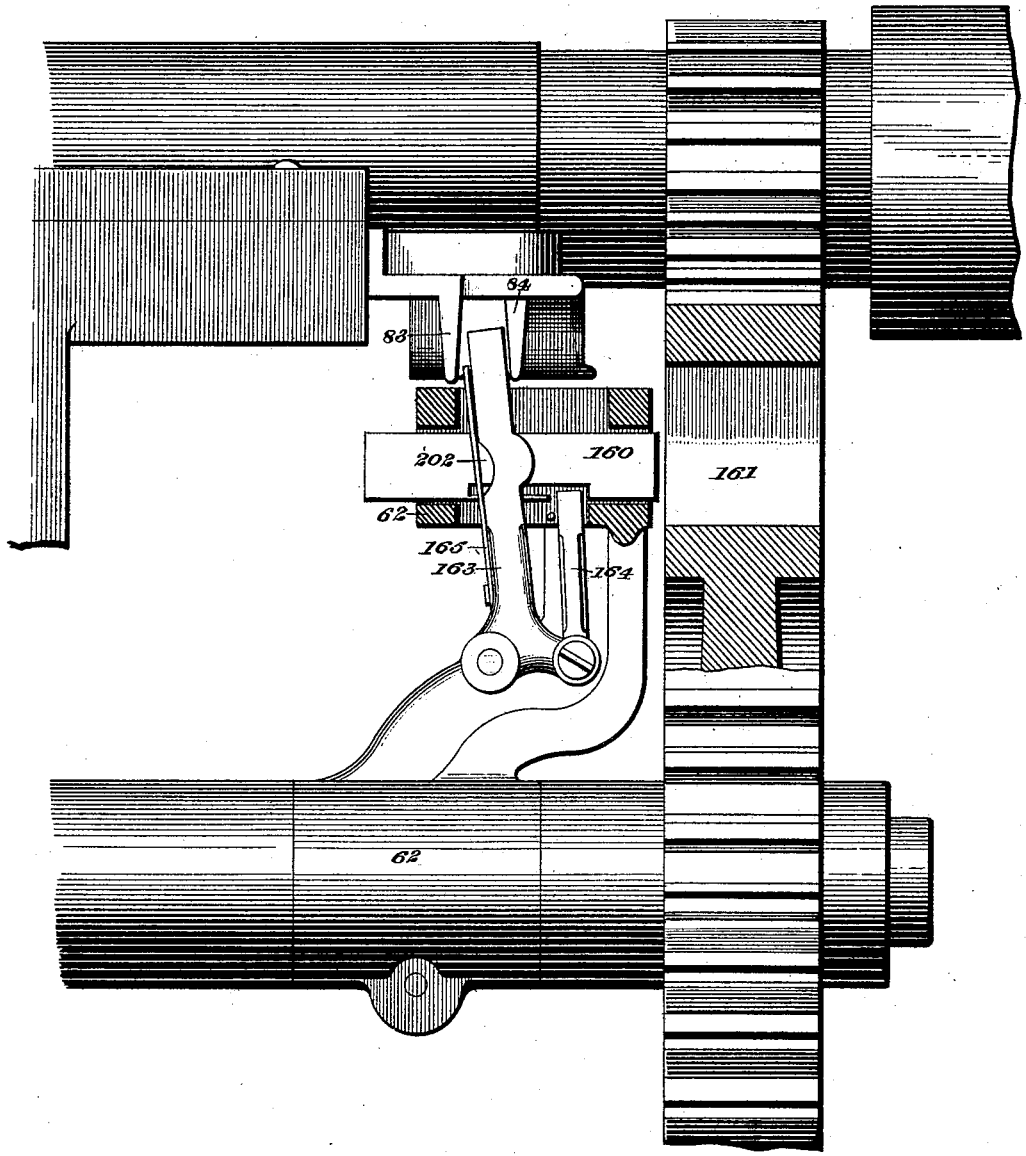
Figure 64:
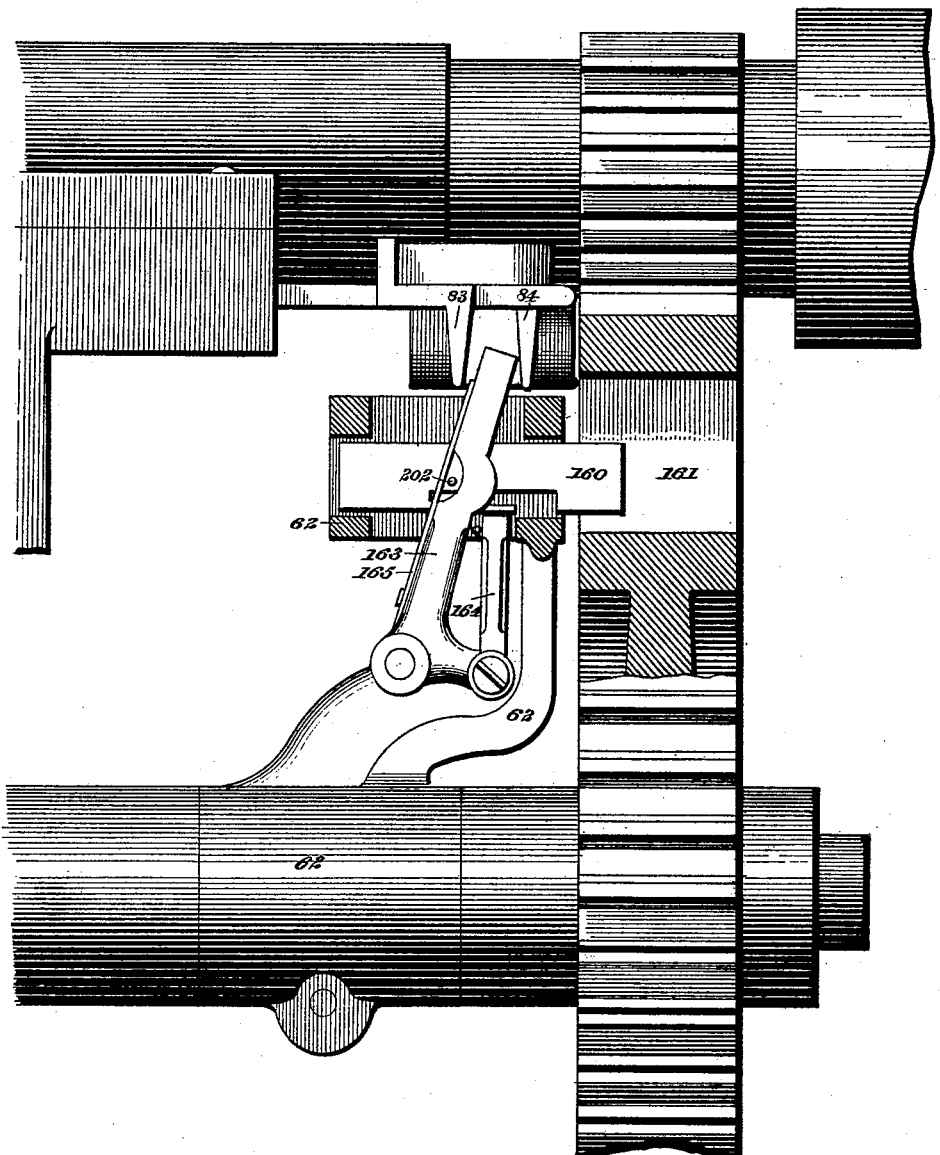
Figure 65:
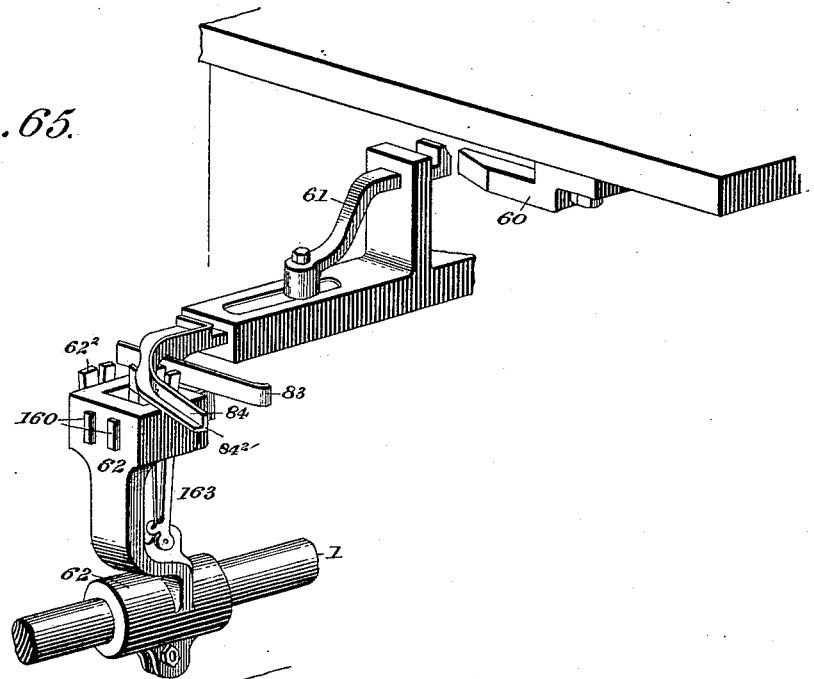
Figure 66:
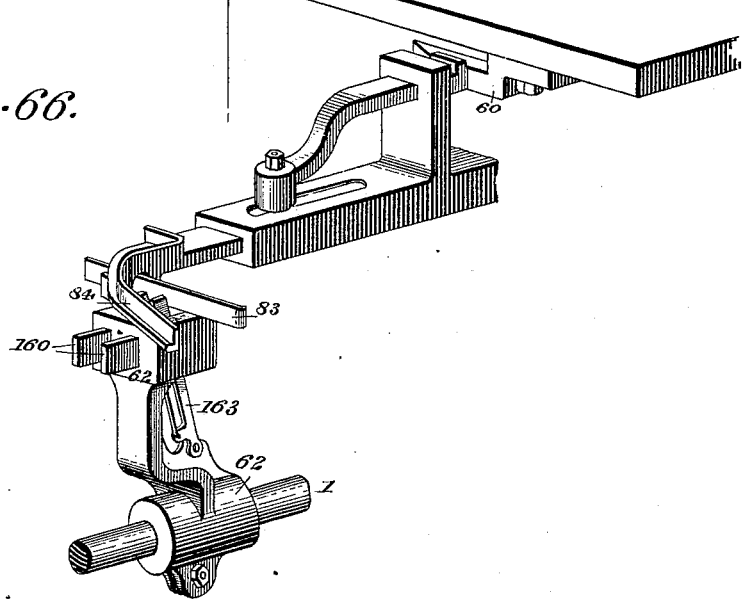

Figure 1 represents a front view of the entire machine; Fig. 2, a side elevation of machine; Fig. 3, a rear elevation in perspective; Fig. 4, a plan view of machine. Figs. 5, 6, 7, and 8 represent the file-blank deliverer in various positions. Fig. 9 represents file-blank-carrying finger. Fig. 10 represents frame of head of file-blank deliverer. Fig. 11 is a sectional plan view of the barrel with its spring and attachments for operating the clamping-wedge. Fig. 12 represents spring and guide of file-blank-engaging finger; Fig. 13, a spring-lug of file-blank deliver; Fig. 14, a view of segmental gear for operating rack of file-blank deliverer; Fig. 15, a section through file-blank deliverer at segmental gear; Fig. 16, a link connecting the operating-rack with head of file-blank deliverer; Fig. 17, a view of the operating-rack; Fig. 18, a view of file-blank deliverer; Fig. 19, a descriptive figure showing position when the file-blank deliverer has delivered the file-blank against the perpendicular side of the file-blank bed. Fig. 20 is a perspective top view of file-blank carriage, showing file-blank and its operative mechanism when the file-blank is in position, and also the chuck; Fig. 20$^A$, a plan of file-magazine, file-blank carriage, and file-blank deliverer at the point of delivery of file-blank from file-blank deliverer in file-blank carriage, also chuck and chuck-operating carriage and its operative mechanism. Fig. 20$^B$ is a detailed view of part of the operating mechanism to clamp the file-blank on its bed; Fig. 21, a section of file-blank chuck with jaws open ready to receive file-blank. Fig. 22 is a view of same, showing jaws closed; Fig. 23, a front view of same with jaws closed. Fig. 24 is a view of chuck and chuck-carrying frame; Fig. 25, a view showing operating-cam and feed-lever and portion of file-blank deliverer; Fig. 26, a top view of file-blank chuck without jaws; Fig. 27, a pin which causes the revolution of the file-blank chuck. Fig. 27$^2$ is a view of one of the jaws of the file-blank chuck. Fig. 28 is a perspective view of other jaw of file-blank chuck. Fig. 29 is a perspective view of the chuck, chuck-operating carriage, file-blank carriage, and appendages. Fig. 30 is revolving lug in file-blank chuck for purpose of releasing file-blank; Fig. 30², a view of same when revolving lug is turned downward; Fig. 31, a section of file-blank chuck, showing pin in position; Fig. 32, a clamp-jaw support of file-blank chuck; Fig. 33, a view of file-blank-chuck-carrying frame and portion of chuck-operating frame, also catch-hook and trip for controlling the barrel. Fig. 33^A is a perspective view of the trip. Fig. 34 is a view of ratchet into which pawl engages for the purpose of operating expanding leaf of operating-wedge to assist in ejecting file from machine; Fig. 35, a front view of head of machine, showing chisel-magazine and chisel-holder, tension-screw, and mechanism for operating and adjusting the chisel and chisel-shifting mechanism. Figs. 36, 37, and 38 are views of chisel-magazine; Fig. 39, a chisel; Fig. 40, a view of chisel-holder carrying chisel; Fig. 41, a view of clamp and spring for holding chisel in place; Fig. 42, a cap which rests on top of chisel-holder; Fig. 43, a clutch-shifter; Fig. 44, a section of Fig. 40, showing cam, chisel, clamp, tension-spring and tappet and tension-wires; Fig. 45, chisel-shifting carriage and devices connected therewith; Fig. 46, a sectional view of cams and cam-shaft for operating chisel-holder; Fig. 47, a section of machine showing operation of mechanism for operating file-blank-carriage feeder and file-blank carriage. Fig. 48 shows the machine ready to feed, file-blank-carriage feeder, and file-blank carriages. Fig. 49 shows shifter and counting mechanism and operation thereof. Fig. 50 shows plate-bearing mechanism of the counter; Fig. 51, a counter-arm. Fig. 52 shows link connecting shifter with shifting-lever. Fig. 53 shows frame of swinging lug. Fig. 54 shows plan of shifter complete; Fig. 55, another view of Fig. 52; Fig. 56, a view of shifter and counting devices engaged. Figs. 57 and 60 show construction of the counter. Figs. 58 and 59 show releasing-lever; Fig. 61, a section of chisel-magazine filled with chisels and portion of chisel-shifting arm; Fig. 62, a view of chisel-shifting cam, chisel-shifting arm, and means for operating the same. Fig. 62^A is a plan view of a portion of the chisel-shifting mechanism; Fig. 63, a view showing section of clutch, clutch-shifter, connecting-rod, spur-pinion, and gear, with clutch disengaged from spur-gear; Fig. 64, a view of same, showing clutch engaged with spur-gear; Fig. 65, a view showing shifting devices out of operation. Fig. 66 shows same in operation. Fig. 67 shows clutch, clutch-shifter, and gearing disengaged. Fig. 68 shows method of automatically adjusting tension of the chisel-holder; Fig. 69, another view of clutch and clutch-shifting devices disengaged from the gearing; Fig. 70, another view of clutch and clutch-shifting devices and fixed lug for operating the clutch-shifter to release the clutch from the gear; Fig. 71, another clutch and clutch-shifting devices showing clutch engaged with the gearing. Fig. 72 shows a clutch, clutch-shifting devices, and the connecting-rod in connection with the wedge on the file-blank carriage for operating the same, showing the dogs of the clutch as they appear when engaged with the gearing.

The operations which are carried out in my improved machine are as follows: first, the transfer of the file-blank from the magazine into the file-blank chuck; second, the clamping of the file-blank in the file-blank bed; third, the travel of the file-blank bed and file-blank under the reciprocating cutter or chisel; fourth, the reversal of the file-blank on the bed and its return to its original position; fifth, the second travel of the file-blank bed and its file-blank under the chisel to cut the opposite face; sixth, the lateral swinging movement of the file-blank-chuck carriage and opening of the chuck to discharge the finished file; seventh, the return of the chuck to its normal position and so as to receive a new file-blank; eighth, to automatically discharge a worm-chisel and insert a fresh one into the chisel-holder after a given or predetermined number of reciprocations of the file-blank bed.

I will first explain the construction of the apparatus for producing movement of the file-blank from file-blank magazine into the chuck and blank carriage—that is, the operation of the file-blank deliverer.

Fig. 1 shows the file-blanks 5 to be operated upon stacked in the file-blank magazine. The machine, being arranged to operate upon two file-blanks at the same time, is constructed with duplicate mechanism on each side of the machine, the power for the movement of both being derived from a common source. In this specification, where the mechanism is specifically treated of, reference will be made to one set of mechanisms, it being understood the other set is constructed and operated in a similar manner, but at the opposite side of the machine.

1, Fig. 3, shows the shaft which, operating through the spur-wheels 2 and 3, Fig. 3, operates the cam 4, which in turn operates the file-blank deliverer. (Shown in perspective in Fig. 3 and in detail in Figs. 5, 6, 7, and 8.) The corresponding file-blank deliverer is shown on right side of Fig. 3. This file-blank deliverer is also shown in Fig. 20^A. Fig. 5 represents the position of the file-blank deliverer at its initial point. The file-blanks are represented, as before, by 5. The head of the file-blank deliverer is composed of the file-blank-engaging finger 6 and spring-lug 6½, (shown in Fig. 13,) which retain the lowermost file-blank engaged in the file-blank deliverer. Upon motion being given to this file-blank deliverer by means of the cam 4, before mentioned, through the feed-lever 7, Fig. 25, said feed-lever operates upon the file-blank deliverer through the jaw 8. The extent of motion of the file-blank deliverer is governed by the extent of the cam 4. Prior to the point at which the limit of motion of the travel of the file-blank deliverer is reached the pin 9, Figs. 5, 8, and 20^A, engages at the end of the slot 10 in the guide of the file-blank deliverer, Figs. 20ᴬ and 6, bringing the rack-slide 13 to rest. The further motion of feed-lever 7, Fig. 25, causes the half-segmental gear 12, (shown in Fig. 14,) having a spring within its barrel, to operate upon the rack 13, Fig. 5, (shown in Fig. 17,) so that when the deliverer is moved by the lever 7 the rack 13 will move also until the pin 9 stops it, when the spring in the gear-barrel will be put under tension by winding up. This rack 13 is held in a fixed position by the pin 9, and to the rack is attached the link 14, Fig. 5, with clip end, as shown in Fig. 16. This clip end of the link 14 is pinned to the pivoted head of the file-blank deliverer at 14². The frame of the head 17, (shown in Figs. 6 and 10,) the spring and its guide 17², (shown in Fig. 12.) and the spring-lug 6½ (shown in Fig. 13) are all shown in operating position in Fig. 8. The further motion of the feed-lever 7 causes the file-blank deliverer to move forward, causing the head to be drawn to a position shown in Figs. 7 and 19. This motion causes the file-blank to be turned from its face to its edge, or so as to make one-quarter of a revolution, the file-blank 5 still being held by the file-blank-engaging finger and spring-lug, as shown in Fig. 7. This also causes the spring in the segmental gear 12 to be put under tension. When the file-blank deliverer is in the position shown in Fig. 7, the feed-lever 7, Fig. 25, drops off the cam 4. The spring within the barrel of the half-segmental gear 12 thus becomes active, causing the segmental gear 12 to return back over the rack 13 to the position shown in Fig. 6. When at that point, the inertia obtained returns the blank-deliverer to the position shown in Fig. 5. The file-blank, as shown in Figs. 19 and 20ᴬ, is in position to be placed in the file-blank chuck and at that point is introduced into it, as hereinafter set out.

So far we have followed the transfer of the file-blank from the magazine to its point of delivery to the file-blank chuck. We will now examine this part of the machine and follow the manipulations of the file-blank while in the custody of the chuck.

The essential object of the chuck is to receive the file-blank and reciprocate it longitudinally during the process of cutting, and after one side is cut to automatically present another side, and finally discharge the completely-cut file-blank.

In Fig. 20ᴬ, 5 represents the file-blank; 19, the file-blank bed, the file-blank touching the jaw 20 of the file-blank chuck. The chuck is shown in detail in Figs. 21, 22, and 24. The jaw 20 is pivoted on the rivet 21, Fig. 21, to which is also pivoted the other jaw, 22. The jaw 20 is held by means of the toe of the said jaw resting in a notch, 24, in said clamp, and held there by spring 25, acting upon pin 26, Fig. 21, which pin presses against the jaw above its hinge-point 21. Fig. 32 shows the clamp for closing the jaws, which is shown in connection with the jaws in Figs. 21 and 22.

The other jaw, 22, is held open by means of a compressing-link, 27, and spring 27². In Fig. 20ᴬ the file-blank is pressing against the jaw 20, which causes the toe of said jaw to rise out of the notch 24, Fig. 21, releasing the spring 29, which surrounds the stem 28 of the clamp, (shown also in Fig. 21,) causing the file-blank chuck to take the position shown in Fig. 22, in which the clamp has moved forward and closed the jaws toward each other, so as to grasp the file-blank chuck.

In Figs. 11 and 20ᴬ, 30 represents a long barrel containing a spiral spring, 30½, Fig. 29, and when in the position shown in Fig. 20ᴬ the spring in the barrel is held by means of the hook 29, pivoted at 29² to an arm of the clamp-dog 72 on the barrel, which hook is engaged with the frame at 201, as shown in Fig. 33, so as to retain the spring 30½ in proper condition for further work. The trip 31, Figs. 33 and 33ᴬ, slides loosely on the stem of the clamp, and is held in position by a light steady-shaft, 31², Fig. 20ᴬ, which works against a small spring, 31³, Fig. 33. When the file presses the toe, the spring 29 of the clamping-stem is released. This causes the revolving lug 32, Figs. 30, 31, and 33, (said revolving lug being attached to the stem of the clamp,) to strike the trip 31, which in turn releases the hook 29, allowing the spring in the barrel 30, Fig. 20ᴬ, to complete its work, causing the barrel to move downward, pushing the wedge 33, Fig. 20ᴬ, before it. The end of the wedge 33 strikes on the pivoted block 34², pivoted at 34⁴, which tilts the block 34² downward, (see Fig. 20ᴮ,) elevating the end of the lever 34 at 34³, which lever 34 is pivoted on the block 34² at 35 to a position parallel with the file-blank. A further motion of the wedge 33 causes the flat end 36 of the lever 34 to swing laterally and to press against the file-blank, pushing and clamping the file-blank against the perpendicular side of the file-blank bed 37, as shown in Figs. 19 and 20. At the same time by means of this movement of the barrel 30 (the barrel 30 being connected with the chuck-operating carriage by means of the link 238 and an arm of the clamp-dog) a longitudinal motion is given to the chuck and its carrying-frame 38 toward the chisel, and a swinging motion is imparted to the chuck-carrying frame upon the file-blank carriage, to which it is pivoted at 39, by means of the wedge 38², Fig. 20, carried by the chuck-operating frame, being forced between the end of the chuck-carrying frame 38 and the fixed trundle 38⁴, Fig. 20, thus causing the chuck-carrying frame and chuck to be swung in a direction toward the barrel 30, whereby the file-blank is brought against the wall of the file-blank bed, Fig. 20. This firmly fixes the file-blank in the chuck and on the file-blank bed in a condition for cutting the filing-surface upon one edge.

We now have shown how the file-blank is brought into position to be cut, and it is now necessary to show how a feeding motion is imparted to the file-blank carriage with its bed and chuck, whereby the file-blank may be intermittently fed beneath the cutter or chisel.

The operation of the file-blank carriage with its chuck beneath the chisel is caused by what I term a "file-blank-carriage feeder," which is fed upward by means of a screw.

In Figs. 4, 47, and 48, $39^2$ represents the file-blank-carriage feeder, that is connected with the file-blank carriage $37^2$, Fig. $20^A$, by means of the shaft 40, Fig. 4, made rigid to the file-blank-carriage feeder by set-screws 41. The file-blank-carriage feeder is shown in detail in Figs. 47 and 48.

In Fig. 44, 42 shows the chisel and devices for operating the same, which devices will be more minutely described farther on in this specification.

43 in Fig. 47 is the feeding-screw for operating the file-blank-carriage feeder, and is constantly rotating, and 44 is the bevel-gear which operates the screw 43, and may receive its power from any source desired.

46 is a half-nut, which normally rests upon the screw 43. The revolution of the screw 43 causes the nut 46, which is attached to the file-blank-carriage feeder $39^2$, to travel upward on the screw, carrying the file-blank with it, presenting one of its edges under the chisel 95, Fig. 47. This operation could be accomplished by means of a rack and pinion or any other suitable device. A presser-foot, 59, is used for the purpose of retaining the file-blank in a constant position during the operation of cutting the edge, and is arranged close to the cutter or chisel and holds down the file-blank during the act of cutting and when traveling under the chisel. The file-blank-carriage rests upon the semicircular piece 46, which rests in a corresponding groove in the compensating base 500, Fig. 48.

The compensating base is designed to keep the file-blank bed raised, so as to insure the file-blank traveling against the under edge of the presser-foot, whereby the chisel shall cut only a given depth into the file-blank. Furthermore, this compensating base is lowered automatically to depress the file-blank when it is desired to turn the same or when returning the file-blank carriage to its normal position. Fig. 47 shows inside view of this compensating base. The compensating base 500 is supported on the connecting-rod 49. (Shown in dotted lines.) The end of this connecting-rod 49 at 53 has a projection which passes through and rests in the pressure-lever 54. This lever 54 is fulcrumed at 55, and its other end, 56, rests upon the bottom of the strong spiral spring 57, wound around the rod 58. The amount of tension of this spring 57 governs the amount of pressure of the file-blank against the presser-foot 59. When the file-blank has reached the limit of its passage for cutting the first edge, it is necessary to turn the file-blank so as to present its uncut edge and return the file-blank so turned to the initial point of cutting. The method and mechanism by which this is accomplished are as follows:

In order to turn the file-blank it is first necessary to drop it away from contact with the presser-foot 59, so that it may have space in which to turn, and this is accomplished in the following manner: The dogs 160, carried by the clutch-frame 62 on shaft 1, Figs. 1 and 63, are forced into the orifices 161 on the power gear-wheel 63, which normally runs idle on shaft 1. The power gear-wheel runs in contact with the spur-wheel 62, and when the wheel 62 is loose upon its shaft the file-blank carriage is feeding its blank under the chisel; but when it is desired to return the file-blank carriage the spur-wheel is made fast to its shaft and operates a cam, which performs the function of lowering the compensating base and freeing the file-blank-carriage feeder, which by gravity runs back. The freeing of the feeder from its screw is caused by an intermediate reciprocating frame, known as the "shifter," directly operated by the cam, and this shifter, after it makes a given number of reciprocations, also operates to throw into action the mechanism which changes the chisels.

The means for making the spur-wheel operative to actuate the shifter is as follows: The wedge 60 on the file-blank carriage engages the connecting-rod 6, Fig. 65, having the shifter attached to it, pushing it and the shifter, with its jaws 83 and 84, (shown in Figs. 43 and 65,) forward. The clutch 62 is rigidly attached to shaft 1, and the fingers 163 of the clutch are normally held between the jaws 83 and 84 and are pressed forward by this forward movement of the jaws. The spring 165, attached to the fingers 163, Fig. 64, is brought into tension by the forward movement of the fingers and is held against the pin 202. When the fingers have been moved forward a distance equal to the distance necessary for the dogs 160 to travel from their normal position into a position in engagement with the orifice 161, Fig. 63, on wheel 63, the stop-key is withdrawn from the dogs and the spring forces the dogs into the orifices 161 on the revolving power gear-wheel 63, and this causes the shaft 1 to revolve. The shaft 1 has upon it the cam 64, Figs. 47 and 48, the revolution of which cam causes the shifting lever 65, pinioned at 66, (the shifting lever 65 being connected by the link 67 with the pressure-lever 54,) to turn on its pivoted connection at 66. This causes the link 67 to raise the end of pressure-lever 54 at 56, thus supporting the spring 57. The spring 57, thus supported, ceases to operate upon the compensating base, thus lowering the base and allowing the file-blank carriage and file-blank to drop away from the presser-foot 59, as is shown in Fig. 47.

The next operation is to turn the file-blank so that it presents its uncut edge. The means for accomplishing this function is as follows: To the end of the shifting lever 65 is attached by means of link 69, Figs. 52 and 55, the shifter 70, Fig. 49, (shown in plan view in Fig. 57,) which slides in the slot 71², Fig. 47. The movement of the cam 64 causes this shifter 70, Fig. 49, to move in the slot 71² in the direction from A toward B, Fig. 47. This causes the shifter to strike lever 75 and by suitable mechanism to free the nut 46 from the screw 43. A lug, 71, on the shifter 70, Fig. 49, strikes against a clamp-dog, 72, clamped rigidly to the barrel 30 at the proper position, as shown, Fig. 20ᴬ, carrying the barrel 30 downward with the shifter 70. This movement by means of link 238, Fig. 20ᴬ, on the chuck-operating carriage causes the pin 73 in socket 73² on the chuck-operating carriage (shown in Fig. 31) to have a movement parallel with the central line of the chuck carrying the pin, and this rotates the chuck, as now to be explained.

Surrounding the barrel of the file-blank chuck, as shown in Fig. 26, are two raised spirals S S', each one-half turn. The pin 73 is constructed with a straight edge, $e$, on one face and beveled edge $e'$ on the other face, as shown in Fig. 27, and is so fixed in the chuck-operating carriage that on the downward movement it engages its straight edge with the spiral, which causes a turning of the file-blank chuck (upon which are the two spirals) one-half revolution, and thus turns the file-blank so as to present its other and uncut edge; but on the return movement of the chuck-operating carriage toward its initial point the pin presents its beveled edge against the spiral, which allows it to jump the spiral without turning the chuck and set itself in position to be engaged in the next spiral. At the same time the barrel 30, Fig. 20ᴬ, by its movement withdraws the wedge 33, allowing a lateral and downward movement of the end 34³ of the clamping-lever 34 by means of the spring 35², (the reverse of that heretofore described in this specification,) releasing the body of the file-blank, so that it can be moved away from the file-blank bed and turned. At this point the wedge 38² (being fast to the chuck-operating carriage) is carried back with the carriage, and the expanding leaf 38³, Fig. 20ᴬ, which in this operation is closed, begins to act between the side of the chuck-carrying frame to which it is pivoted and trundle 38⁵, swinging the end of the chuck carrying the file-blank upon its pivot 39 a sufficient distance away from the perpendicular side of the file-blank bed 37 onto the platform 39² to enable the file-blank to be turned. A pawl, $t'$, attached to the chuck-carriage, in this movement, turns the ratchet R, (shown in Figs. 20ᴬ, 29, and 34) so as to operate a two-throw cam to press out the expanding leaf 38³, which leaf then acts to shift the chuck-carrying frame to move the file-blank. It is to be understood that these movements of releasing the file-blank from its bed, the lateral shifting of the chuck-carrying frame, and rotation of the chuck are substantially simultaneous.

The next operation is to return the file-carriage and chuck and chuck-operating carriage to their initial positions. This is accomplished in the following manner: By a further and final movement of the shifter 70, Figs. 47 and 48, the arm 74, which is a part of the shifter 70, strikes the lug 75³ on the link 75, one end of said link being pinioned at 75² to the main-frame of the machine, the other end being pinioned to the lifter 76 at 76². This further movement of the shifter 70 causes the lifter 76 to travel downward from A' to B', and the lower end of this lifter at 77, Figs. 47 and 48, is beveled and slides on a corresponding upward bevel, 78, on the main frame of the machine. The nut 46 is connected to this lifter by the stud 79, Fig. 47, and the rubber spring 80, the stud 79 passing through the slot 81 in the lifter 76, as is shown in Figs. 40 and 47. This oscillation of lever 75 by shifter 70 results in an upward movement of the lifter 76, causing the nut 46 to be raised from the screw 43, Figs. 47 and 48, said nut 46 being connected to the file-blank carriage by the bar 46², which is pivoted at 46'. The condition being such as is shown in Fig. 47, the spring in the barrel 30, Fig. 20ᴬ, carries the carriage downward until it occupies the same position in relation to the barrel that it did before the shifter 70 operated on the barrel. This returns the file, with its edge turned, to its position against the side of the file-blank bed, leaving the expanding leaf 38² open, and the clamping-arm 34, operating as before described, presses the file-blank firmly against the side of the file-blank bed. The action of gravity and the inertia gained by the carriage return the file-blank carriage, chuck, and chuck-operating carriage to their initial positions. The cam 64 at this time presents its concaved face, and this releases the shifting lever 65, and the tension-spring 65², Fig. 48, then thrusts the shifting lever 65, with the shifter, nearly back from B to A. The lifter then assumes its initial position and the nut 46 drops back onto the screw to induce the second feeding action for the cutting operation. The spring 57, being no longer sustained by the link 67, acts on the end of pressure-lever 54 and raises the compensating base to its original position, carrying the file-blank carriage upward, so as to hold the blank again in the desired position against the presser-foot for cutting. These movements result from the rotation of the shaft 1, which is put in motion by wheel 63 and the clutch mechanism secured to the shaft and operated by the clutch-shifter.

The clutch-shifter which shifted the clutch 62 into gear, as heretofore described, is shown in Fig. 43, and also shown in Figs. 63, 64, 65, 66, 67, 69, 70, 71, and 72. In making the above movements the clutch has been in gear.

The operation for drawing the clutch out of gear when the work of the shifting lever is completed is accomplished as follows: The clutch-shifter has two jaws, 83 and 84, as before described. The jaw 84 has a beveled end, 84², Fig. 65, and when the clutch has almost made a complete revolution with the idle-wheel 63 a lug, 62², Fig. 65, on the clutch 62 strikes the beveled end 84² of jaw 84, drawing the clutch-shifter outward and compressing the spring 82, Fig. 43, and placing the fingers 163 (operating the dogs 160) between the jaws 83 and 84, Figs. 65 and 66. The instant the lug 62² has revolved past the jaw 84 it ceases to hold the shifter out and the spring in compression. The shifter thus released is forced back by the spring 82, carrying with it the fingers 163 and the dogs 160, which the fingers operate, the latter being moved out of connection with the idle-wheel 63. The two extreme portions of these dogs and their operating mechanism are shown in Figs. 65 and 66, and also in Figs. 63 and 64.

The clutch-shifter mechanism, it is seen, operates automatically, so that when the shaft 1 makes one revolution the mechanism operated by the said shaft 1 shall be put out of action. Such mechanism will remain out of action until the carriage has made another upward movement, when it will again act to allow the carriage to return by gravity. The clutch is normally out of action, and is only put into action when the file-blank carriage completes each of its movements for presenting a face of the file-blank to the cutting action of the chisel. In other words, the clutch is never in action when the chisel is cutting.

The next operation is the cutting of the file-teeth on the other and uncut edge of the blank. The mode of travel and cutting of this edge is identical with the operation heretofore described for the other edge. When this edge has been cut, it is necessary in this operation to open the clutch, so as to drop the file-blank, and the file-blank must be removed a distance from the side of the file-blank bed sufficient for it to drop free from the machine. The chuck is also turned so as to be in proper position to receive another file-blank, and the file-blank carriage, chuck, and chuck-operating carriage are returned to the position shown at Fig. 20^A.

The mechanism for dropping the compensating base is the same as heretofore described. The shifting lever and the shifter operate by similar mechanism and in a similar manner as before described, and the operation of the barrel and turning-pin 73 are the same as before described. The discharge of the cut file and resetting of the jaws of the file-bank chuck are produced as follows: The revolving lug 32, Figs. 30 and 31, is attached to the stem 28 of the clamp, Fig. 32. This lug 32 is normally in the position shown in Fig. 30 when the file-bank is first introduced into the chuck. When the pin 73 causes the chuck to be turned, as heretofore described, it also causes the edge 90³ of the lug 32 to be turned downward in the position shown, Fig. 30, out of the way, so that the dog 91, Fig. 31, fails to strike it when carried toward it by the chuck-operating carriage; but on the second turning of the chuck by the pin 73, which I am now describing, the edge 90³ of the lug becomes exposed to the action of the dog 91, attached to the chuck-operating frame, and the dog engages the lug, carrying the clamp with it, pulling it to the position shown at Figs. 21 and 24. When at this point, the end of the dog 91 at 91² strikes the incline of the trip 93, Fig. 31, which lifts the dog off of the lug 32, at which point no further motion is given to the clamp, but it is held in the fixed position shown in Figs. 21 and 24 by the toe of the jaw 20 falling into the notch 24, and the jaws are open. By this action the file has been released and the jaws set in a position to receive another blank.

The body of the file-bank is released by lever 34 in the same manner as before described.

During the above operation the wedge 38², being fast to the chuck-operating carriage, is carried back with it, and the expanding leaf 38³ (which in this operation is open) begins to act between the side of the chuck-carrying frame and trundle 38⁵, swinging the end of the chuck carrying the file-blank away from the perpendicular side of the file-blank bed, clearing it of the platform 39², so that the file may fall from over the side of the machine, the chuck being opened, as above described, after this position of the file and the chuck-carrying frame has been assumed. The clamp-jaws are pulled back by the dog 91 engaging the lug 93, as heretofore described, compressing the spring 29, and the trip 31 is moved back by its spring 31³, Fig. 33^A, and the hook 29 drops down, engaging with the stop 201 on the chuck-operating carriage. The spring in the barrel 30 and spring 29 of the chuck are now compressed and the barrel is in condition to be returned by the action of its spring, as has heretofore been described.

So far I have described the construction and operation of the machine for receiving a file-blank from the magazine, delivering it to the chuck, then swinging it over onto the file-blank bed, next the feeding of the blank under the chisel to cut one edge or face, then turning the file-blank on its bed to present an uncut edge or face to the chisel, then returning the chuck and bed, then passing said uncut face or edge under the chisel, then automatically discharging the cut file from the machine and the chuck and returning it to its normal position to receive another file-blank. It now remains for us to consider the cutting devices *per se.*

The mechanism, construction, and manner of operating the chisel by which the file-teeth are cut on the edges of the file-blank will now be described.

Fig. 39 is a view of the chisel 95. Fig. 40 represents the chisel-holder with the chisel 95 in position.

96 is the chisel-holder, the clamping-lever 97 of which is pivoted to the chisel-holder at 97², the groove 95², Fig. 39, of the chisel receiving the end of the clamping-lever 97. This clamping-lever 97 has a spring, 97⁴, one end of which is attached to the chisel-holder and the other end to the clamping-lever for the purpose of clamping the end $97^3$ in the groove $95^2$ of the chisel 95. The chisel-holder 96 has V-shaped guides $96^2$ and $96^3$, which fit into corresponding V-shaped grooves in the head of the machine. The chisel-holder is held in position on the machine by means of the two wires 98, one at the top the other at the bottom of the chisel-holder, each wire having a head to fasten it to the holder and pulled upon by springs. Holes $98^2$, Fig. 44, are drilled through the chisel-holder to receive these wires. For a certain distance these holes are the size of the head of the wire, and for the remainder of the distance they are the size of the wire itself, as shown in Fig. 44. The wires pass through the frame of the machine, as shown in Fig. 47, and are connected to the ends of the leaf-spring $99^4$. This leaf-spring is held at $99^5$ to a rod, 100, threaded at the outer end, 101, passed through the arm 102, and a nut, 104, is screwed on the outer end of the rod 100, said nut moving the screw until it strikes the shoulder 103, when any further movement will draw the rod through the arm, thus enabling the friction of the chisel-holder in its guides to be adjusted.

The mechanism by which the chisel is reciprocated is as follows:

In Fig. 44, 105 is the operating cam, and 106, Fig. 46, is the cam-shaft, (the machine being constructed, as before stated, for cutting two blanks at the same time, two cams are shown on this shaft.) The revolution of the cam causes the lifts of the cam to strike the operating end 107 of the tappet 108, Fig. 44, lifting the chisel-holder and chisel. When the extreme lift of the cam passes the tappet, the chisel-holder drops. The force of the blow of the chisel upon the file-blank, caused by the drop of the chisel-holder, is greater or less, according to the extent of the drop of the chisel-holder and the tension of the spring 109, Fig. 44. The tension of the spring 109 is adjusted by means of the screw 110, working through the nut 111, the nut being solid with the yoke 112 of the front of the machine, Figs. 47 and 35. The turning of the hand-wheel on the screw causes the screw, the end of which presses on the rubber 109, to compress the spring to a greater or less degree. The yoke 112, Fig. 35, can also be moved up and down by the shaft 213, and if a wedge, 204, Fig. 68, of the desired construction is placed on the file-blank-carriage feeder and passes under the pivoted lever 205, one end of which is attached to the foot of the shaft 213, it will draw the yoke down proportionately to the pitch of the wedge, and thus during the travel of the file-blank under the chisel the force of the blow of the chisel may be automatically adjusted to vary the depth of cut. In order to adjust the extent of the drop to be given to the chisel-holder, the presser-foot 59, Fig. 48, is bolted to the presser-bar 113, Figs. 3 and 47, and a screw, 114, passes through the frame of the machine and has its lower end in the presser-bar. The turning of this screw elevates or depresses the presser-foot, allowing the file-blank to rise up or be pushed down. In order that the file-blank during its whole course may be against the presser-foot, the slot 115 in the link 67, Figs. 47 and 48, heretofore referred to, is constructed of sufficient length, so that as the taper or swell of the edge of the file-blank varies the pressure-lever can always force the file-blank against the presser-foot.

When it becomes necessary to raise or lower the compensating base a greater distance than the capacity of the pressure-lever 54, to follow the wear of the chisel or the difference in the various sizes of the file-blanks, it is accomplished in the following manner: The end 50, Fig. 47, of the connecting-rod 49 of the compensating base has a screw which works through the worm-nut 51, held in the base, and a worm, 52, works into the exterior of this worm-nut, and to this worm is attached the hand-wheel 53, Fig. 48, which by turning causes the compensating rod, which is jointed at $49^2$, to be raised or lowered, thus elevating or lowering the compensating base, as is desired, to give it greater capacity. During the turning of the file-blank and the return of the file-blank carriage—i. e., as before described, it is necessary that the chisel should not operate—to intermittently rotate the cam-shaft 109 the following mechanism and operations are necessary.

Fig. 35 shows an elevation of chisel-holder, chisel mechanism, &c. The tappet 108, Fig. 44, projects outward, as shown at 117, Fig. 44, and this projection 117 of the tappet 108 rests upon the dog 119 of the swinging arm 118, Figs. 1 and 35, when the chisel-holder is at the highest point of its lift. The swinging arm 118 is forced and held under the projection of the tappet by the flat spring 121, Fig. 35, preventing the chisel-holder from falling when the cam revolves, and thus preventing any motion being given to the chisel-holder and chisel at such times as said arm 118 is swung around in a manner to insert the dog 119 under the tappet. In order that this arm 118 may be in the position to support the projection of the tappet, it is made vertically adjustable in the following manner: The swinging arm 118 is held by the rod 120, which passes through it, and this rod 120 passes through the boss 122 on the head of the machine and is fixed in the boss so that the rod has a rotary motion only. The arm 118 is adjustable vertically on the rod 120, as at $118^2$, so that the arm may be raised or lowered vertically to bring it into such a position that the projection of the tappet 108 will rest upon it. As may be seen, the chisel is thus normally out of action. The manner of causing this arm 118 to be set into action is as follows:

As has been before described, when the shifter 70 has completed its work it returns from B toward A, Fig. 47, but not its entire distance, as the lug 71, Fig. 49, strikes a lug, 71², Fig. 20ᴬ, cast on the file-carriage, which prevents its further motion; but when the file-carriage begins to travel up the machine the lug 71² draws away from the lug 71, allowing the shifter to return to its original position. On the secondary return motion of the shifter the pin 123 on the shifter, Fig. 49, which may be adjustable, strikes the spring-lug 124, attached to the swinging arm 118, Fig. 35, swinging the arm 118 away from under the projection 117 of the tappet 108, thus allowing the tappet to fall, and the action of the cam elevates it again, as before described, and the chisel-holder and chisel are brought into action, the arm 118 being held away by the pin 123 of the shifter 70. When the file-blank has been cut on one edge, the shifter 70 again comes into action, as before described, and is moved in the direction from A toward B, Fig. 47, carrying the pin 123 with it. This motion removes the pin from the spring-lug 124, and the spring 121 causes the arm 118 to return back, so that when the tappet is at the top of the throw of the cam the projection 117 will rest on the arm 118 and the action of the chisel-holder be suspended. The chisel-holder might be brought into motion at once when the file-carriage is at the position for the commencement of the travel of the file-blank under the chisel by dispensing with the lug 71², before described, on the file-carriage and allowing the shifter to return from B to A by one movement; but it is preferable that the chisel-holder should not commence acting before the file-carriage has commenced to travel. If the nut 46 should not fall correctly upon the screw 43, (the return of the shifter being made in one movement,) the chisel-holder would be brought into action before the file-carriage moved. The double return movement of the shifter also enables all lost motion to be taken up.

So far we have followed the action and arrangement of the cutting devices. A chisel subjected to such heavy work as cutting file-blanks soon wears out, and it becomes necessary to replace such worn-out chisel, and this I do automatically. I provide a chisel-magazine and automatic devices which, after a given number of movements of the shifter, cause the worn-out chisel to be discharged from the holder and a fresh sharp chisel transferred from the magazine into such holder, such change taking place between successive reciprocations of the file-blank bed under the cutter or chisel.

The method and mechanism by which the worn chisels are removed from the chisel-holders and new chisels introduced in their place are as follows:

In Figs. 35, 36, 37, and 38, 126 represents the chisel-magazine, in which chisels to replace the worn chisels in the machine are stacked. 95, as before, represents the chisel. The construction of this magazine is particularly shown in Figs. 36, 37, 38, and 61. The spring-barrel 141 holds the chisels 95 in position, and when one chisel is removed the follower 142 on the spring-barrel 141 pushes the chisels along consecutively, so that the next chisel will be in a position to be carried laterally from the chisel-magazine into the chisel-holder 96 on the machine. The chisel-magazine is secured to the head of the machine, as is shown in Fig. 35, and there is one magazine on each side of the machine to supply chisels to the two chisel-holders. The chisel-shifting carriage, by which the chisels are carried from the chisel-magazine into the chisel-holder, is shown at 129 in Figs. 35 and 62. This chisel-shifting carriage travels in the guide-slot 130, Fig. 35, in the head of the machine. 128, Fig. 62, is the pivoted chisel-shifting arm, its pivot being at 216 on the carriage.

Fig. 45 shows the chisel-shifting carriage 129 and chisel-shifter 144. The outer chisel in the magazine rests loosely in the groove A B of the shifter 144, Fig. 45, and is retained between the chisel-shifter and the head of the machine by the chisel-shifting arm 128. Upon motion being given to the chisel-shifting carriage, as will hereinafter be explained, the carriage slides in the slot 130 in the main frame, as before specified.

Referring to Fig. 62, the chisel-shifting carriage 129 travels, carrying with it the chisel-shifting arm 128 and the chisel to be inserted in the chisel-holder. The chisel-shifting carriage is moved until the spring-fingers constituting the chisel-shifter 144 on the chisel-shifting arm engage the chisel to be withdrawn from the chisel-holder. At this point the wedge 141, secured to the chisel-shifting carriage, strikes the dog 214, Figs. 58 and 62, which is pivoted to the releasing-lever 143 and held in position by a spring, 142. This dog 214 is so adjusted that when the wedge 141, in passing, strikes it it passes under it, raising the releasing-lever 143, which presses against the clamping-lever 97 of the chisel-holder, releasing this clamping-lever, pivoted at 97², from the chisel, and at that time, the spring-fingers of the shifter 144 having tightly inclosed the chisel to be removed, the worn chisel is carried on by the new chisel in the custody of the spring-fingers aforesaid. In its initial position the fresh chisel which is being carried to the chisel-holder is above the position which it should occupy to be introduced into the chisel-holder, and it is caused to drop downward the desired distance by means of the angular piece 140, Fig. 62, set in the head of the machine at such a position that when the new chisel in its passage reaches this point it is forced downward the desired distance, so that it can be introduced into the chisel-holder 96 at the proper point. The old chisel now having been pushed out and the new chisel having been introduced into the chisel-holder, the forward motion ceases to be given to the chisel-shifting carriage, and at this time the wedge 141 has passed beyond the dog 214, and the releasing-lever 143, being relieved from the wedge 141, allows the chisel-clamping lever 97 to again lock the fresh chisel securely in the chisel-holder. The chisel-shifting carriage is now returned to its initial position by means of springs, to be hereinafter described.

It is necessary, prior to the return movement of the chisel-shifting carriage, that the spring-fingers of the chisel-shifter 144, which are in the position shown in Fig. 35, (left side,) when the fresh chisel has been placed in the chisel-holder, shall be moved outward, so as to return without striking the chisel thus placed in the holder, or any part of the mechanism, until it has nearly reached its initial position, and this is accomplished in the following manner: The chisel-shifting arm is normally held against the face of the head 130 of the machine by a spring, 300, on the arm attached to the pivoted latch 145, (shown in Figs. 62 and 62$^A$,) and when the travel of the chisel shifting carriage and shifting arm have reached the end of their movement (to the left) the latch 145 falls into the recess 147 on the head of the machine, which recess is so situated that the latch 145 will drop into it at the time the new chisel has been placed in the chisel-holder. This dropping of the latch 145 into the recess 147 releases the spring 300 on the arm, and when thus released a spring, 216, causes the chisel-shifting arm to move outward, so that the spring-fingers 144, still holding the worn chisel, in returning to their initial position, pass clear of the chisel-holder and mechanism on the head of the machine. When near the end of the return movement of the chisel-shifting carriage, a dog fitted into the slotted head 217, Fig. 35, of the chisel-shifting arm and cushioned by a spiral spring, 300, (the latch 145 also being pivoted to the same dog,) strikes an abrupt wedge, 150, Fig. 45, on the head of the machine, forcing the slotted head 217, Fig. 62, outward and the chisel-shifting arm 128 inward, engaging it with a new chisel, and at the same time the rear end of the spring-fingers of the chisel-shifter 144 strike the cam-stop 148 on the head of the machine, which causes the spring-fingers to open and release the worn chisel, which has been removed from the chisel-holder.

The motion is given to the chisel-shifting carriage by the following means: The operator from experience judges the number of edges a chisel is capable of cutting before its edge become sufficiently worn to make it necessary to replace it. In Fig. 49 the upper portion represents the method employed in order to set the chisel-shifter into operation when the desired number of file-blanks have been cut. 132 represents the counter, the end of which has a spiral spring. (Shown in detail in Fig. 57.) The counter slides in a groove on a plate, 219, carrying the counter mechanism. This plate slides in the main frame of the machine. The counter has a number of indentations in its upper and lower surfaces, the indentations being at least equal in number to the number of edges of the file-blanks which each chisel shall cut. 133, Fig. 49, is the counter-arm, the end of which rests in the indentations in the counter 132. When the shifter 70, having performed its function, as has been heretofore described, is returning to its initial position, the pawl 134, Fig. 57, on said shifter strikes the counter 132, carrying it with it one indentation, compressing the spring 151$^3$, Fig. 57, and the counter-arm 133 falls into the next indentation to the one it occupied before the shifter operated on the counter, thus retaining the counter. When the pawl on the shifter 70 has carried the counter to the end of the indentations, the counter-arm 133 drops off and takes the position shown in Fig. 56, carrying the swinging lug 135, (shown in Fig. 53,) which is attached to the counter-arm 133, down with it, so that the pivot-hook 136, Fig. 56, engages with the lug 137 on the shifter 70, and the shifter, traveling, carries the plate 219 along the machine a distance dependent upon the construction of the pivot-hook 136 and lug 137. This pivot-hook and the lug are so constructed that the lug will fall off the pivot-hook when the pivot-hook is carried a distance sufficient to move the chisel-shifting carriage (through mediation of mechanism soon to be described) from its initial position to the position where the fresh chisel has been placed in the chisel-holder.

The swinging lug 135 has a plunger connected with the spring 151, so as to make the pivot-hook 136 positive to the motion of the shifter 70; yet, if by any reason the chisel-shifting carriage is stopped, the added resistance will overcome the spring 151 and allow the swinging hook 136 to press backward off the lug 137 into the frame of the swinging lug 135. The lug 137 and pivot-hook 136 are so constructed that in the movement given to this hook 136 the shifter 70 draws the swinging lug 135 downward, compressing the spring 151, which is connected with the outer end of this swinging lug 135. When the lug 137 falls off the pivot-hook 136, as heretofore described, the spring 151 is released and draws the swinging lug 135 upward. On the upward movement of this swinging lug it strikes the counter-arm 133, elevating it clear of the counter 132, releasing the spring 151$^3$, which returns the counter to its initial position and the counter-arm falls into the first indentation of the counter 132, and the device is again set for counting. The connection between the counter device and chisel-holder is as follows: The movement of this counter device, just described, moves the lever 153, Fig. 3, connected to it by pin 153$^3$ and attached at right angles to a shaft journaled in the box marked 153$^2$, and at the other end of this shaft is attached another lever, 154, Fig. 4, also at right angles to the shaft. This latter lever is attached to the chisel-shifting carriage through connecting-rod 155, Fig. 62, so that motion given to the lever 153 communicates motion to the lever 154, and finally to the chisel-shifting carriage, at right angles to the motion of the lever 153. The forward movement of the chisel-shifting carriage 129 causes a tension upon the spring 156, Figs. 4 and 69, which spring is riveted to lever 154 at one end, and is held fixed by pin 157 on the main frame of machine at the other end. (Shown in Fig. 4.) When the forward motion of the chisel-shifting carriage ceases, the spring draws the chisel-shifting carriage back to its initial position, as shown in Fig. 62.

This machine necessarily involves many details of construction, and I wish it to be understood that I do not limit myself to what is specifically shown, as such details may be modified without departing from my invention. In this application, however, I do not propose to claim the chisel shifting or changing devices, as they will form subject-matter of a future application.

Having now described my invention, what I claim as new, and desire to secure by Letters Patent, is—

1. In an automatic file-cutting machine, in combination, a file-blank magazine, a file-blank deliverer, a file-blank carriage, and means for operating said file-blank deliverer from said file-blank magazine to said file-blank carriage and returning said file-blank deliverer to its initial position, whereby the file-blanks are automatically delivered from the file-blank magazine to the file-blank carriage.

2. In an automatic file-cutting machine, in combination, a file-blank chuck, a file-blank carriage, a reciprocating chisel, and means to cause said file-blank carriage to travel under said reciprocating chisel and return said file-blank carriage to its initial position.

3. In an automatic file-cutting machine, the combination of a file-blank carriage, a file-blank chuck upon said file-blank carriage, a reciprocating chisel, means to cause said file-blank chuck and carriage to travel under said reciprocating chisel and at the forward end of said travel of the file-blank chuck and carriage, means to cause said file-blank chuck to make one-half turn, and means to return said file-blank chuck and carriage to their initial position, whereby such turning of the file-blank chuck causes the file-blank on its following movement under the reciprocating chisel to present its uncut edge or face.

4. In an automatic file-cutting machine, the combination of a file-blank carriage, a file-blank chuck upon said file-blank carriage, a reciprocating chisel, means to cause said file-blank chuck and carriage to travel under said reciprocating chisel, means to cause said file-blank chuck to make one-half turn, means to return said file-blank chuck and carriage to their initial positions and after said file-blank chuck and carriage have again passed under said reciprocating chisel, and means to release said file-blank from said file-blank chuck and discharge said file-blank from the machine.

5. In an automatic file-cutting machine, the combination of a file-blank magazine, a file-blank deliverer, a file-blank carriage, a file-blank chuck on said file-blank carriage, means for operating said file-blank deliverer, whereby the files are carried from the file-blank magazine into the file-blank chuck, a reciprocating chisel, means for causing said file-blank chuck and carriage to travel under said reciprocating chisel, means for turning said file-blank chuck and its carried file-blank after said travel under said reciprocating chisel and return said file-blank chuck and carriage to their initial position, and means to release and discharge said file-blank after both edges of said file-blank have been presented to the reciprocating chisel, whereby the file-blank is taken from the magazine and automatically acted upon and discharged with its edges or faces cut.

6. In the file-blank deliverer of an automatic file-cutting machine, the combination of a file-blank magazine for a series of file-blanks, a reciprocating frame, a file-blank-engaging finger, and a spring-lug between which the file-blanks are held carried by said frame, and means to reciprocate said frame, substantially as and for the purpose specified.

7. In an automatic file-cutting machine, the combination of a file-blank deliverer having a jaw to grasp the file-blank, a feed-lever working in said jaw, a cam operating said feed-lever, and means for putting said cam into motion.

8. In an automatic file-cutting machine, the combination of a file-blank-deliverer supporting-frame, a file-blank deliverer having pivoted jaws for the file-blank, a slide on said deliverer having a pin or lug which works between stops on the supporting-frame, and a connection between the slide and pivoted jaws, whereby as the deliverer continues its movement the pin arrests the movement of the slide, and a further movement of the deliverer causes the jaws to be rotated on their axis to present the file in another plane from that in which it was received by the jaws.

9. In an automatic file-cutting machine, the combination of a file-blank-deliverer supporting-frame, a file-blank deliverer having pivoted jaws for the file-blank, a slide on said deliverer having a rack and a pin or lug which works between stops on the supporting-frame, a gear on the deliverer meshing with the rack, a spring to rotate the gear so as to tend to move the rack away from the jaws, and a connection between the slide and pivoted jaws, whereby as the deliverer continues its movement the pin arrests the movement of the slide, and a further movement of the deliverer causes the jaws to be rotated on their axis to present the file in another plane from that in which it was received by the jaws.

10. In the file-blank deliverer of an automatic file-cutting machine, the combination of a deliverer-frame, a segmental gear carried thereby, a rack, a pin in said rack, guides for the file-blank deliverer having a slot for said pin, and a link having one end attached to the rack and the other to the head of the file-blank deliverer forming the file-blank jaws, whereby, when necessary, the file-blank may be turned one-quarter turn.

11. In a file-cutting machine, the combination of a file-blank magazine, a file-blank bed, delivering-jaws for transferring the file-blank to the bed, and means, substantially as set out, for moving said jaws between the magazine and bed.

12. In a file-cutting machine, the combination of a file-blank magazine, a file-blank bed, delivering-jaws pivoted on an axis for trasferring the file-blank to the bed, and means, substantially as set out, for moving said jaws between the magazine and bed and simultaneously causing them to rotate upon their axis.

13. In a file-cutting machine, the combination of a file-blank magazine, a file-blank bed, delivering-jaws for transferring the file-blank to the bed, means, substantially as set out, for moving said jaws between the magazine and bed, and a clamping-arm on the bed to receive and hold the file-blank after being delivered by the deliverer.

14. In the file-blank chuck of an automatic file-cutting machine, the combination of a pivoted jaw, 20, a toe upon said jaw, a clamp having a notch in which said toe rests, and a spring to move said clamp over said jaw, whereby the jaw is retained open against the action of the spring when the toe is in the notch.

15. In the file-blank chuck of an automatic file-cutting machine, the combination of the pivoted jaw 22, a clamp to close said jaw, a spring carried by said clamp, and a compressing-link connecting the jaw and spring, whereby said jaw is held open when the clamp is drawn back.

16. In the file-blank chuck of an automatic file-cutting machine, the combination of the pivoted jaws 22 and 20, a clamp, a stem on said clamp, and a spring surrounding said stem of said clamp.

17. In a chuck of a file-cutting machine, the combination of the pivoted jaws, a reciprocating clamp to forcibly close said jaws, a spring to move said clamp forward, and a locking device to hold said clamp back and the spring under compression.

18. In a chuck of a file-cutting machine, the combination of two pivoted jaws, springs to hold said jaws open, a reciprocating clamp to forcibly close said jaws, a spring to move said clamp forward, a locking device to hold said clamp back and the spring under compression, and a trip controlled by one of the jaws to release the spring of the clamp.

19. The combination of the pivoted jaws 20 22, of which the former is provided with a toe, the clamping-jaws for closing the jaws 20 and 22, having a notch, 24, for the toe, a spring, 29, to push said clamp forward over the jaws, a spring on the clamp to oscillate the jaw 20, and a spring and link device to oscillate the jaw 22, whereby said jaws are opened when the clamp is drawn back.

20. In an automatic file-cutting machine, the combination of a barrel, a spring to move said barrel, a lock device for retaining said barrel, so that its spring will be held under compression, a file-blank carriage, and a connection between the said barrel and carriage.

21. In an automatic file-cutting machine, the combination of a barrel, a spring to move said barrel, a lock device for retaining said barrel so that its spring will be held under compression, a file-blank carriage, a connection between the said barrel and carriage, a reciprocating stem carrying the clamp carried by said carriage, and a trip actuated by the stem of the clamp to operate said lock, whereby said barrel is released.

22. In an automatic file-cutting machine, the combination of a barrel, a spring to move said barrel, a lock device for retaining said barrel so that its spring will be held under compression, a file-blank carriage, a connection between the said barrel and carriage, a trip pressed out of active position by a spring, so as to not act on the lock, a file-blank-chuck device for holding the file-blanks carried by the carriage, and a connection between the said chuck device and the trip whereby the action of the chuck upon clamping a file-blank will operate the trip and release the lock, allowing the spring to press the barrel and carriage forward.

23. In an automatic file-cutting machine, the combination of a barrel, a spring to move said barrel, a clamp-dog on said barrel, a hook or lock attached to said clamp-dog, a chuck-carrying frame and a chuck thereon having jaws 20 and 22, a reciprocating clamp to operate said jaws carried by the chuck-carrying frame and having a stem, a trip, 31, which slides loosely on the stem of said clamp, and a lug attached to said stem which, when the jaws of the chuck are released by the clamp, strikes the trip, disengaging the hook or lock and releasing the barrel.

24. In an automatic file-cutting machine, the combination of a barrel, a spring to move said barrel, a lock device for retaining said barrel so that its spring will be held under compression, a file-blank carriage and a connection between the said barrel and carriage, a pivoted clamping-lever on said file-blank carriage, and a connection between the lever and barrel, whereby when the latter is released it operates upon the lever to clamp the file-blank.

25. In an automatic file-cutting machine, the combination of a barrel, a spring to move said barrel, a lock device for retaining said barrel so that its spring will be held under compression, a file-blank carriage, a connection between the said barrel and carriage, a pivoted block on said carriage, a pivoted lever on said block, whereby the lever may have a double motion, and a connection between said barrel and the pivoted block and pivoted lever to operate both for the purpose of throwing the lever up into clamping position and then operating it to clamp the file-blank on the carriage.

26. In the file-operating carriage of an automatic file-cutting machine, the combination of a file-blank chuck, a pivoted chuck-carrying frame, a chuck-operating frame, a wedge on said chuck-operating frame, a fixed trundle for said wedge, and a barrel having a spring and means for retaining said barrel so that the spring is still active, whereby when the barrel is released a swinging motion is given to the chuck and its carrying-frame.

27. In an automatic file-cutting machine, the combination of a file-blank carriage, a pivoted chuck-carrying frame thereon, a file-blank chuck carried thereon, cams or wedge devices arranged on opposite sides of the pivotal point of the chuck-carrying frame, and means, substantially as set out, to operate said cam or wedge devices to oscillate the carriage in one direction or the other.

28. In an automatic file-cutting machine, the combination of a file-blank carriage, a file-blank chuck on said carriage, file-blank-carriage-feeding devices, substantially as described, and means, substantially as set out, for connecting said file-blank carriage and file-blank-carriage-feeding devices.

29. In an automatic file-cutting machine, the combination of a file-blank carriage, a file-blank-carriage-feeder frame, a screw to move said feeder-frame, and a connection between said file-blank carriage and the file-blank-carriage feeder.

30. In an automatic file-cutting machine, the combination of a rotating feeding-screw, a reciprocating file-blank-carriage feeder, a half-nut which normally rests upon the screw, a connection between said half-nut and feeder, a reciprocating file-blank carriage, and a connection between the file-blank carriage and feeder, whereby the half-nut feeder and file-carriage are caused to travel up the machine.

31. In an automatic file-cutting machine, a compensating base whereby the file-carriage can be raised or lowered.

32. In an automatic file-cutting machine, the combination of a compensating base, a connecting-rod upon which said compensating base rests, a projection on the end of said connecting-rod, a pressure-lever in which said projection rests, a rod at the other end of said pressure-lever, a spring around said rod, a file-blank carriage supported by said base, and a presser-foot above said file-blank carriage, whereby the file-blank on the carriage is held against the presser-foot.

33. In an automatic file-cutting machine, the combination of the file-blank carriage, a shaft, 1, a clutch rigidly attached to said shaft, a power-wheel normally running idle on said shaft, a wedge on said file-blank carriage, and intermediate mechanism between the wedge and clutch, substantially as described, whereby, when the file-blank carriage has passed to the limit of its forward travel, the wedge on said file-blank carriage causes said clutch to connect with said idle-wheel.

34. In an automatic file-cutting machine, a file-blank carriage, a wedge, 60, upon said file-blank carriage, a connecting-rod, 61, a shifter, a clutch rigidly attached to shaft 1, the fingers of said clutch normally held between the jaws of the shifter, a spring attached to the fingers to hold the clutch-dogs in the clutch, the dogs 160, and power-wheel 63.

35. In an automatic file-cutting machine, the combination of the pressure-foot, the file-blank carriage, the shaft 1, a cam, 64, upon said shaft, a shifting-lever, 65, link 67, pressure-lever 54, and a compensating base therefor supporting the file-blank carriage, whereby when the shaft revolves the pressure-lever is oscillated and the compensating base and file-blank carriage which it supports drop away from the presser-foot.

36. In an automatic file-cutting machine, the combination of the shaft 1, cam 54 thereon, shifting-lever 65, operated by the cam-shifter 70, link 69, by which said shifter is attached to the shifting-lever, and a reciprocating file-blank carriage controlled by said shifter.

37. In an automatic file-cutting machine, the combination of the reciprocating shifter 70, having a lug, 71, the barrel 30, a clamp-dog, 72, clamped rigidly to the barrel 30 at the proper position, whereby during the motion of the shifter the barrel 30 is carried with said shifter, a file-blank carriage, and a connection between the said clamp-dog or the barrel and carriage.

38. In an automatic file-cutting machine, the combination of the reciprocating shifter 70, having a lug, 71, the barrel 30, a clamp-dog, 72, clamped rigidly to the barrel 30, a chuck-carriage, a file-blank chuck on said carriage, and a chuck-operating carriage, a pin, 73, retained in a socket on the chuck-operating carriage, and two raised spirals, S and S', each one-half turn, surrounding the barrel of the file-blank chuck, whereby during the passage of the shifter down the machine the pin is caused to operate on the spiral, causing the file-bank chuck to rotate one-half turn.

39. In an automatic file-cutting machine, the combination of a file-blank chuck, a chuck-operating carriage, a pin on said carriage having one edge straight and the other beveled, and two raised spirals, each one-half turn, surrounding a barrel connected to the file-blank chuck, said pin on the downward movement of the chuck-operating carriage presenting its straight edge to the spiral, which causes a turning of the file-blank chuck one-half turn, and on the return movement of the chuck-operating carriage presenting its beveled edge, so as to jump the spiral without turning the chuck and setting itself in position to be engaged in the next spiral.

40. In an automatic file-cutting machine, the combination of the reciprocating shifter 70, barrel 30, having the wedge 33, the pivoted clamping-lever 34, and spring $35^2$, acting on said lever, whereby when the shifter operates upon the barrel the wedge is withdrawn and the clamping-lever released from the file-blank.

41. In an automatic file-cutting machine, the combination of the reciprocating shifter 70, having the lug 71, the barrel 30, having the clamp-dog 72, the chuck-operating carriage, link 238 between the dog and carriage, the wedge $38^2$, and the closed expanding leaf $38^3$, made fast to the chuck-operating carriage, the pivoted chuck-carrying frame having a file-bed, and the trundles $38^4$ and $38^5$, whereby when the shifter 70 causes the chuck-operating carriage to move down the machine the wedge and expanding leaf act against the trundles, causing the end of the chuck carrying the file-blank to swing away from the perpendicular side of the file-blank bed.

42. In an automatic file-cutting machine, the combination of the pivoted chuck-carrying frame or carriage, the chuck-operating carriage, expanding leaf $38^3$, carried by said chuck-operating carriage, a pawl attached to the chuck-carriage, a ratchet having cams acting on said expanding leaf and acted on by the pawl, and a trundle or projection in the path of the leaf, substantially as set out.

43. In an automatic file-cutting machine, the combination of the reciprocating shifter 70, the feeder for the file-blank carriage, a rotary feed-screw, a half-nut carried by the feeder, a lifter, 76, adapted to be moved upward by the shifter, and a connection between the lifter and half-nut, whereby when the shifter has descended the half-nut will be raised from the screw and the feeder be left free to move backward.

44. In an automatic file-cutting machine, the combination of the reciprocating shifter 70, having the arm 74, the lifter 76, the link 75, having one end pivoted to the main frame of the machine and the other end to the lifter 76, whereby when the arm 74 of the shifter strikes the link the lifter rises, a reciprocating feeder, a feed-screw, a half-nut meshing with said screw, and a connection between the half-nut and lifter.

45. In an automatic file-cutting machine, the combination of the reciprocating shifter 70, the lifter 76 having its lower end beveled, intermediate mechanism whereby at the desired time the shifter operates the lifter, the half-nut 46, the stud 79, connecting the nut and lifter, the slot 81, in which said stud travels, and the bevel-guide 78 on the main frame of the machine, the file-blank chuck and its operating-carriage, and a connection between said chuck-operating carriage and half-nut, whereby the travel of the lifter causes the nut to be raised from the screw, and the file-blank chuck and chuck-operating carriage allowed to return to their initial position.

46. In an automatic file-cutting machine, the combination of a clutch-shifter having jaws 83 and 84 and spring 82, and in which the jaw 84 is beveled, a shaft, 1, for operating the file-blank-operating devices, clutch 62 on said shaft, the power-wheel 63, the fingers 163 and dogs 160 on the clutch, and also a lug, $62^2$, on said clutch, so adjusted that when the clutch has nearly made a complete revolution with the wheel 63 the lug 62 strikes the beveled end of the jaw, drawing the clutch-shifter outward and compressing the spring 82 and placing the fingers 163 between the jaws of the clutch-shifter, whereby when the lug rotates off the jaws of the clutch-shifter the spring in the clutch-shifter will draw out the clutch-shifter dogs, releasing them from engagement with the wheel 63.

47. In an automatic file-cutting machine, the combination of a rotary file-chuck having a clamp provided with a stem and adapted to hold the jaws open or closed, a lug, 32, upon the stem of said clamp, having an edge, $90^3$, means to rotate said file-chuck, a chuck-operating frame, and a dog, 91, attached to the chuck-operating frame, said lug 32 being so adjusted that on the rotation of the chuck after the first edge is cut upon the file the edge of said lug 32 will be turned away from the dog 91, but on the rotation of the chuck after cutting the second edge upon the file-blank the edge $90^3$ is turned upward, so as to engage the dog 91, whereby the further traveling of the chuck-operating frame draws the clamp with it, opening the jaws of the file-chuck and releasing the file-blank.

48. In an automatic file-cutting machine, the combination of the file-blank chuck having movable jaws, chuck carriage or frame, chuck-operating carriage, a lug, 32, operating with the jaws of the file-blank chuck, a dog, 91, pivoted to the chuck-operating carriage, and a trip, 93, in the path of the dog, whereby when the dog 91 moves backward it pushes the lug 32 back to set the jaws open and then strikes the trip 93, causing the dog to be lifted from the lug, whereby it is free to move forward again when the jaws are closed.

49. In an automatic file-cutting machine, the combination of the chuck-operating carriage, the wedge $38^2$, made fast to the chuck-operating carriage, the expanding leaf $38^3$, and the fixed trundles $38^4$ and $38^5$, said expanding leaf $38^3$ being held open by means of the ratchet R, having cam-faces, the reciprocating shifter 70, the barrel 30, acted on by the shifter, and intermediate mechanism which, at the proper part of the movement of the shifter, causes the chuck-operating carriage to move down the machine, whereby the end of the chuck-carriage carrying the file-blank is swung away from the side of the file-bed clear of the platform, so that it may fall over the side of the machine.

50. In the chisel-holder of an automatic file-cutting machine, the combination of a clamping-lever pivoted to the chisel-holder, and a spring having one end attached to the chisel-holder and the other end pressing on the clamping-lever, and a chisel having a groove in its head which receives the end of the clamping-lever, whereby the chisel is held fixed in the chisel-holder.

51. In the chisel-operating devices of an automatic file-cutting machine, the combination of a chisel-holder, 96, having a V-shaped guide projection, a corresponding V-shaped guide in the head of the machine, wires 98, which pass through the chisel-holder at the top and bottom, and a support for the free ends of said wires, whereby the chisel-holder is fixed to the machine.

52. In the chisel-operating devices of an automatic file-cutting machine, the combination of the chisel-holder 96, the wires 98, one at the top and the other at the bottom of the chisel-holder, each wire having a head, the holes $98^a$, drilled in the chisel-holder, through which the wires pass, the leaf-spring 99, to the ends of which the wires are connected after passing through the head of the machine, and means for increasing or decreasing the tension on the leaf-spring 99 and chisel-holder.

53. In the chisel-operating devices of an automatic file-cutting machine, the combination of the leaf-spring 99, an adjusting-rod, 100, threaded at the outer end, to the inner end of which the spring is connected, arm 102, through which said rod passes, and a nut, 103, on the outer end of said rod 100, whereby the tension can be increased or decreased on the leaf-spring 99 and chisel-holder.

54. In the operating mechanism of the chisel of an automatic file-cutting machine, the combination of a chisel-holder and operating-cam, 105, means for rotating said operating-cam, and the tappet 107, having operating end 108 so adjusted that the revolution of the cam causes the lift of the cam to strike the operating end of the tappet, lifting the chisel-holder and chisel, and when the extreme lift of the cam has passed beyond the operating end of the tappet the chisel-holder and chisel drop, whereby a reciprocating motion is communicated to the chisel.

55. In the operating mechanism of the chisel of an automatic file-cutting machine, the combination of the chisel-holder 96, the spring 109, a screw pressing on said spring, and a nut, 111, of the machine through which the screw works, whereby the force of the blow of the chisel upon the file-blank may be adjusted.

56. In the operating mechanism of the chisel of an automatic file-cutting machine, the combination of the yoke 112, the shaft 213, a lever, 205, one end of which is attached to the foot of said shaft, and a wedge, 204, of the desired construction, placed on the file-blank carriage, whereby, during the travel of the file-blank under the chisel, the force of the blow of the chisel may be automatically adjusted.

57. In the operating mechanism of the chisel of an automatic file-cutting machine, the combination of the presser-foot 59, a presser-bar, 113, to which said presser-foot is secured, and a screw which passes through the frame of the machine and has a connection with the presser-bar, whereby the extent of drop to be given to the chisel-holder may be adjusted.

58. In an automatic file-cutting machine, the combination of the compensating base 500, pressure-lever 54, link 67, having slot 115, a cam-and-lever device, substantially as described, for moving said link, pin 114, fixed in said pressure-lever and working in said slot 115, a presser-foot, 59, and a connection between the compensating base and pressure-lever, whereby a uniform drop of the chisel within the limit of the slot is obtained during the passage of the file-blank.

59. In the compensating-base device of an automatic file-cutting machine, the combination of the pressure-lever 54, spring 57, acting thereon, the connecting-rod 49, having a screw cut in its end and connected with lever 54, a nut-worm, 51, through which said rod works, a compensating base holding said nut, and a worm, 52, working into the exterior of the nut 51, whereby when said worm is operated the compensating base is elevated or lowered.

60. In an automatic file-cutting machine, the combination of a file-blank carriage, means, substantially as described, to reciprocate the carriage, a chisel, a chisel-holder, means, substantially as described, to reciprocate the chisel, and the means, substantially as described, to arrest the reciprocating of the chisel during the return of the file-blank carriage to its initial position.

61. In the chisel-operating devices of an automatic file-cutting machine, the combination of the chisel-holder 96, the tappet 108, having projection 117, the swinging arm 118, and a dog, 119, on said swinging arm, so adjusted that said dog rests under the projection 117 when the chisel-holder is at its highest point, whereby the chisel is prevented from reciprocating.

62. In the chisel-operating devices of an automatic file-cutting machine, the combination of the rod 120, the tappet 108, the vertically-adjustable swinging arm 118, which passes through and is returned by the rod 120, and a boss, 122, on the head of the machine, in which said rod 120 is fixed so as to have a rotary motion only, the foot of said rod being pivoted in the main frame of the machine.

63. In an automatic file-cutting machine, the combination of the reciprocating shifter 70, having the lug 71, and the file-blank carriage having a lug, $71^a$, fixed on it, whereby on the return movement of the shifter up the machine the lug 71 strikes the lug $71^a$, retaining the shifter until released by the movement of the file-blank carriage up the machine.

64. In an automatic file-cutting machine, the combination of the reciprocating shifter 70, the adjustable pin 123 on said shifter, the spring-lug 124 in the path of the pin, the swinging arm 118, operated by the spring-lug and having the dog 119, the chisel-holder, and the tappet 108, whereby when on the return movement of the shifter the pin strikes the spring-lug the swinging arm 118 is swung away from under the projection of the tappet, allowing the chisel to reciprocate.

65. In an automatic file-cutting machine, the combination of the spring-lug 124, the swinging arm 118, operated by the spring-lug and having a dog, 119, the chisel-holder, the tappet, and spring 121, for rotating arm 118, whereby the swinging arm is normally held in such a position that the projection of the tappet will rest upon its dog at the extreme lift of the chisel-holder.

JOSIAH F. FRENCH.

Witnesses:
JOSHUA MATLACK, Jr.,
FRANK CROWNE.